United States Patent
Mohammed et al.

(10) Patent No.: US 9,462,453 B2
(45) Date of Patent: Oct. 4, 2016

(54) GLOBAL PLATFORM FOR MANAGING SUBSCRIBER IDENTITY MODULES

(71) Applicant: JASPER TECHNOLOGIES, INC., Santa Clara, CA (US)

(72) Inventors: Jahangir Mohammed, Saratoga, CA (US); Scott Barkley, San Mateo, CA (US); Amit Gupta, Livermore, CA (US); Daniel G. Collins, Plano, TX (US); Jack McGwire, Sunnyvale, CA (US)

(73) Assignee: Jasper Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/924,520

(22) Filed: Oct. 27, 2015

(65) Prior Publication Data
US 2016/0050555 A1    Feb. 18, 2016

Related U.S. Application Data

(63) Continuation of application No. 14/624,419, filed on Feb. 17, 2015, now Pat. No. 9,179,295, which is a continuation of application No. 14/511,022, filed on Oct. 9, 2014, now Pat. No. 8,965,332, which is a (Continued)

(51) Int. Cl.
| | |
|---|---|
| *H04M 11/00* | (2006.01) |
| *H04W 8/18* | (2009.01) |
| *H04L 29/06* | (2006.01) |
| *H04W 4/24* | (2009.01) |
| *H04W 8/04* | (2009.01) |
| *H04W 12/06* | (2009.01) |
| *H04W 4/00* | (2009.01) |

(Continued)

(52) U.S. Cl.
CPC .......... *H04W 8/183* (2013.01); *H04L 63/0428* (2013.01); *H04L 63/0853* (2013.01);

(Continued)

(58) Field of Classification Search
CPC ... H04W 12/06; H04W 8/183; H04W 4/001; H04W 4/24; H04W 4/003; H04W 8/06; H04W 8/205; H04W 48/18; H04W 8/04; H04W 8/265; H04W 8/10; H04W 76/02; H04W 8/08; H04L 61/6054; H04M 15/715
USPC ......................................... 455/406
See application file for complete search history.

(56) References Cited

U.S. PATENT DOCUMENTS

| | | |
|---|---|---|
| 5,353,340 A | 10/1994 | Kunz |
| 5,379,423 A | 1/1995 | Mutoh et al. |

(Continued)

FOREIGN PATENT DOCUMENTS

| | | |
|---|---|---|
| EP | 1229751 A1 | 8/2002 |
| EP | 1392077 A1 | 2/2004 |

(Continued)

OTHER PUBLICATIONS

Extended Search Report from corresponding application No. 15197652.9 dated Apr. 22, 2016.

(Continued)

*Primary Examiner* — Kwasi Karikari
(74) *Attorney, Agent, or Firm* — Blakely Sokoloff Taylor & Zafman, LLP

(57) ABSTRACT

Disclosed is method comprising: storing in a home location register (HLR) at least one subscription record of a mobile device of the plurality of mobile devices, the mobile device having a subscriber identity module (SIM) identified by a currently activated first international mobile subscriber identity (IMSI), the currently activated first IMSI belonging to a set of IMSIs allocated to the system, wherein the provisioning server is operative to: receive a notification that the mobile devices has moved into a first one of the wireless networks; confirm that an allocation rule is satisfied; add and activate a second one of the IMSIs in the set of IMSIs to the HLR and remove the currently activated first IMSI from the HLR; and send the second IMSI to the mobile device to enable the mobile device to communicate wirelessly in the first wireless network as a local device.

15 Claims, 19 Drawing Sheets

Related U.S. Application Data continuation of application No. 14/270,143, filed on May 5, 2014, now Pat. No. 8,868,042, which is a continuation of application No. 13/911,438, filed on Jun. 6, 2013, now Pat. No. 8,725,140, which is a continuation of application No. 13/413,516, filed on Mar. 6, 2012, now Pat. No. 8,478,238, which is a continuation-in-part of application No. 11/119,401, filed on Apr. 29, 2005, now Pat. No. 8,346,214, and a continuation-in-part of application No. 11/398,493, filed on Apr. 4, 2006, now Pat. No. 8,498,615, and a continuation-in-part of application No. 11/804,582, filed on May 18, 2007, now Pat. No. 8,745,184.

(60) Provisional application No. 61/567,017, filed on Dec. 5, 2011.

(51) Int. Cl.
*H04W 8/10* (2009.01)
*H04M 15/00* (2006.01)
*H04W 60/00* (2009.01)
*H04W 8/26* (2009.01)

(52) U.S. Cl.
CPC ............. *H04M15/07* (2013.01); *H04M 15/70* (2013.01); *H04M 15/715* (2013.01); *H04M 15/725* (2013.01); *H04M 15/7556* (2013.01); *H04M 15/80* (2013.01); *H04M 15/8038* (2013.01); *H04M 15/8083* (2013.01); *H04W 4/001* (2013.01); *H04W 4/003* (2013.01); *H04W 4/24* (2013.01); *H04W 8/04* (2013.01); *H04W 8/10* (2013.01); *H04W 12/06* (2013.01); *H04W 60/00* (2013.01); *H04M 2215/208* (2013.01); *H04M 2215/2026* (2013.01); *H04W 8/26* (2013.01)

(56) References Cited

U.S. PATENT DOCUMENTS

| | | | |
|---|---|---|---|
| 5,734,699 A | 3/1998 | Lu et al. | |
| 5,854,982 A | 12/1998 | Chambers et al. | |
| 5,943,619 A | 8/1999 | Coyne et al. | |
| 5,943,916 A | 8/1999 | Baumann et al. | |
| 6,124,799 A | 9/2000 | Parker | |
| 6,584,310 B1 | 6/2003 | Brenzweig | |
| 6,997,379 B2 | 2/2006 | Boyce et al. | |
| 7,027,813 B2 | 4/2006 | Hicks et al. | |
| 7,184,768 B2 | 2/2007 | Hind et al. | |
| 7,190,969 B1 | 3/2007 | Oh et al. | |
| 7,266,371 B1 | 9/2007 | Amin et al. | |
| 7,274,933 B2 | 9/2007 | Zinn et al. | |
| 7,366,510 B2 | 4/2008 | Gunaratnam et al. | |
| 7,369,528 B2 | 5/2008 | Tian | |
| 7,395,083 B2 | 7/2008 | Buckley | |
| 7,483,694 B2 | 1/2009 | Varanda | |
| 7,668,573 B2 | 2/2010 | Laroia et al. | |
| 7,676,552 B2 | 3/2010 | Eilam et al. | |
| 7,788,352 B2 | 8/2010 | Breuer et al. | |
| 7,987,449 B1 | 7/2011 | Marolia et al. | |
| 8,036,664 B2 | 10/2011 | Khetawat et al. | |
| 8,107,953 B2 | 1/2012 | Zimmerman et al. | |
| 8,112,549 B2 | 2/2012 | Srinivasan et al. | |
| 8,149,749 B2 | 4/2012 | Maeda et al. | |
| 8,264,687 B2 | 9/2012 | Lundquist et al. | |
| 8,295,817 B2 | 10/2012 | Alfano et al. | |
| 8,745,184 B1 | 6/2014 | Barkley et al. | |
| 8,842,631 B2 | 9/2014 | Horn et al. | |
| 8,965,332 B2 * | 2/2015 | Mohammed | H04L 63/0428 455/406 |
| 9,084,088 B2 | 7/2015 | Barkley et al. | |
| 2002/0041576 A1 | 4/2002 | Chang et al. | |
| 2002/0154632 A1 | 10/2002 | Wang et al. | |
| 2002/0197991 A1 * | 12/2002 | Anvekar | H04W 8/183 455/432.1 |
| 2003/0022689 A1 | 1/2003 | McElwain et al. | |
| 2003/0027581 A1 | 2/2003 | Jokinen et al. | |
| 2003/0037755 A1 | 2/2003 | Nomura | |
| 2003/0041131 A1 | 2/2003 | Westerinen et al. | |
| 2003/0064723 A1 | 4/2003 | Thakker | |
| 2003/0086425 A1 | 5/2003 | Bearden et al. | |
| 2003/0157935 A1 | 8/2003 | Kauhanen | |
| 2004/0043752 A1 | 3/2004 | Matsumura | |
| 2004/0097230 A1 | 5/2004 | Natarajan et al. | |
| 2004/0103171 A1 | 5/2004 | Mullis, II et al. | |
| 2004/0103717 A1 | 6/2004 | Westernacher et al. | |
| 2004/0113929 A1 | 6/2004 | Matsuzaki | |
| 2004/0203744 A1 | 10/2004 | Hicks et al. | |
| 2005/0020243 A1 | 1/2005 | Benco et al. | |
| 2005/0037755 A1 | 2/2005 | Hind et al. | |
| 2005/0079863 A1 | 4/2005 | Macaluso | |
| 2005/0097595 A1 | 5/2005 | Lipsanen et al. | |
| 2005/0113088 A1 | 5/2005 | Zinn et al. | |
| 2005/0255880 A1 | 11/2005 | Inoue | |
| 2005/0266825 A1 | 12/2005 | Clayton | |
| 2006/0017396 A1 | 1/2006 | Dowe | |
| 2006/0019647 A1 | 1/2006 | Muhonen et al. | |
| 2006/0030315 A1 | 2/2006 | Smith et al. | |
| 2006/0035631 A1 | 2/2006 | White et al. | |
| 2006/0173976 A1 | 8/2006 | Vincent et al. | |
| 2006/0205434 A1 | 9/2006 | Tom et al. | |
| 2007/0014243 A1 | 1/2007 | Meyer et al. | |
| 2007/0026861 A1 | 2/2007 | Kuhn et al. | |
| 2007/0037521 A1 | 2/2007 | Babut et al. | |
| 2007/0083528 A1 | 4/2007 | Matthews et al. | |
| 2007/0245238 A1 | 10/2007 | Fugitt et al. | |
| 2007/0268631 A1 | 11/2007 | Guo et al. | |
| 2008/0040452 A1 | 2/2008 | Rao et al. | |
| 2008/0084993 A1 | 4/2008 | Peddireddy et al. | |
| 2008/0277482 A1 | 11/2008 | Parlange et al. | |
| 2009/0002968 A1 | 1/2009 | Li et al. | |
| 2009/0029684 A1 | 1/2009 | Rosenblatt et al. | |
| 2009/0055736 A1 | 2/2009 | Yoon | |
| 2009/0059829 A1 | 3/2009 | Bachmann et al. | |
| 2009/0075646 A1 | 3/2009 | Lohlein et al. | |
| 2009/0098867 A1 | 4/2009 | Varanda | |
| 2009/0150218 A1 | 6/2009 | Brunner et al. | |
| 2009/0191857 A1 | 7/2009 | Horn et al. | |
| 2010/0010922 A1 | 1/2010 | Foottit et al. | |
| 2010/0125495 A1 | 5/2010 | Smith et al. | |
| 2010/0192062 A1 | 7/2010 | Anwar | |
| 2010/0273456 A1 | 10/2010 | Wolovitz et al. | |
| 2010/0273462 A1 | 10/2010 | Thorn et al. | |

FOREIGN PATENT DOCUMENTS

| | | |
|---|---|---|
| EP | 1672945 A1 | 6/2004 |
| FR | 2790161 A1 | 8/2000 |
| FR | 2814029 A1 | 3/2002 |
| GB | 2389745 A | 12/2003 |
| WO | 0070900 A1 | 11/2000 |
| WO | 0137602 A1 | 5/2001 |
| WO | 0221872 A1 | 3/2002 |
| WO | 02067563 A1 | 8/2002 |
| WO | 2011/036484 A2 | 3/2011 |
| WO | 2013/085852 A1 | 6/2013 |

OTHER PUBLICATIONS

ETSI TS 100 922 V7.1.1 (1999) Digital Cellular Telecommunication Systems (Phase 2+), Subscriber Identity Modules (SIM) (GSM 02.17 version 7.1.1; Release 1998.

3GPP TS 03.20 V9.0.0 (Jan. 2000) 3rd Generation Partnership Project: Digital Cellular Telecommunication System (Phase 2+) Security Related Network Functions, 2000.

* cited by examiner

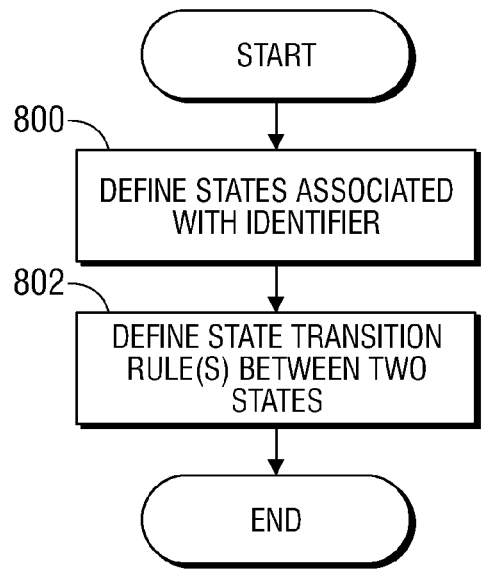

GLOBAL PLATFORM FOR MANAGING SUBSCRIBER IDENTITY MODULES

CROSS-REFERENCE TO RELATED APPLICATIONS

This application is a continuation of U.S. patent application Ser. No. 14/624,419 entitled Global Platform for Managing Subscriber Identity Modules filed on Feb. 17, 2015 which is a continuation of U.S. patent application Ser. No. 14/511,022 entitled Global Platform for Managing Subscriber Identity Modules filed on Oct. 9, 2014, issued on Oct. 21, 2015 as U.S. Pat. No. 8,965,332, which is a continuation of U.S. patent application Ser. No. 14/270,143 entitled Global Platform for Managing Subscriber Identity Modules filed May 5, 2014, issued on Oct. 21, 2014 as U.S. Pat. No. 8,868,042 which is a continuation of U.S. patent application Ser. No. 13/911,438 entitled Global Platform for Managing Subscriber Identity Modules filed on Jun. 6, 2013, issued as U.S. Pat. No. 8,725,140 on May 13, 2014. U.S. patent application Ser. No. 13/911,438 claims the benefit of priority for prior Provisional Patent Application No. 61/567,017, filed on Dec. 5, 2011 and is also a continuation of U.S. patent application Ser. No. 13/413,516, entitled Global Platform for Managing Subscriber Identity Modules filed on Mar. 6, 2012 and issued as U.S. Pat. No. 8,478,238 on Jul. 2, 2012 which is a continuation in part of co-pending U.S. patent application Ser. No. 11/119,401 entitled SELF PROVISIONING OF WIRELESS TERMINALS IN CELLULAR NETWORKS filed Apr. 29, 2005 and issued as U.S. Pat. No. 8,346,214 on Jan. 1, 2013, a continuation in part of co-pending U.S. patent application Ser. No. 11/398,493 entitled SELF PROVISIONING OF WIRELESS TERMINALS IN CELLULAR NETWORKS filed Apr. 4, 2006 and issued as U.S. Pat. No. 8,498,615 on Jul. 30, 2013, and a continuation in part of co-pending U.S. patent application Ser. No. 11/804,582 entitled WIRELESS COMMUNICATION PROVISIONING USING STATE TRANSITION RULES filed May 18, 2007 and issued as U.S. Pat. No. 8,745,184 on Jun. 3, 2014.

BACKGROUND OF THE INVENTION

In a wireless system, the wireless terminal has a Subscriber Identity Module (SIM), which contains the identity of the subscriber. One of the primary functions of the wireless terminal with its SIM in conjunction with the wireless network system is to authenticate the validity of the wireless terminal (for example, a cell phone) and the wireless terminal's subscription to the network. The SIM is typically a microchip that is located on a plastic card, a SIM card, which is approximately 1 cm square. The SIM card is then placed in a slot of the wireless terminal to establish the unique identity of the subscriber to the network. In some cases, the wireless terminal itself contains the subscriber identification and authentication functionality so that a separate SIM and/or SIM card is not utilized.

In the SIM (or within the wireless terminal) an authentication key and a subscriber identification pair are stored. An example of such a pair would be the authentication key Ki as used in GSM networks and the associated subscriber identification IMSI (International Mobile Subscriber Identity). Another example would be the authentication key A-Key and subscriber identification MIN (Mobile Identification Number) as used in CDMA and TDMA networks. In either case, a corresponding identical set of an authentication key and a subscriber identification are stored in the network. In the SIM (or in the wireless terminal) and within the network, the authentication functionality is run using the local authentication key and some authentication data which is exchanged between the SIM and the network. If the outcomes of running the authentication functionality in the SIM and in the network leads to the same result, then the SIM/wireless terminal are considered to be authenticated for the wireless network.

In existing wireless systems, a SIM (or wireless terminal) has an authentication key associated with only one subscriber identification and this subscriber identity is typically tied to a local region or network. When a SIM (or wireless terminal) authenticates in a region that is not local or with a network that is not local, then usually the SIM (or wireless terminal) needs to pay additional roaming service charges to connect with the wireless network. It would be beneficial if the SIM (or wireless terminal) were not permanently tied to a local region or network. For example, equipment vendors would then be able to sell the same equipment in multiple regions and for multiple networks with one physical SIM card. Additionally, end users may avoid roaming service charges or at least more favorable subscription terms may be available.

BRIEF DESCRIPTION OF THE DRAWINGS

Various embodiments of the invention are disclosed in the following detailed description and the accompanying drawings.

FIG. 8 is a flow diagram illustrating an embodiment of a process for mobile data communication provisioning.

FIG. 9 is a block diagram illustrating an embodiment of a state definition.

FIG. 10 illustrates an embodiment of a state transition rule definition.

DETAILED DESCRIPTION

Figure 1:
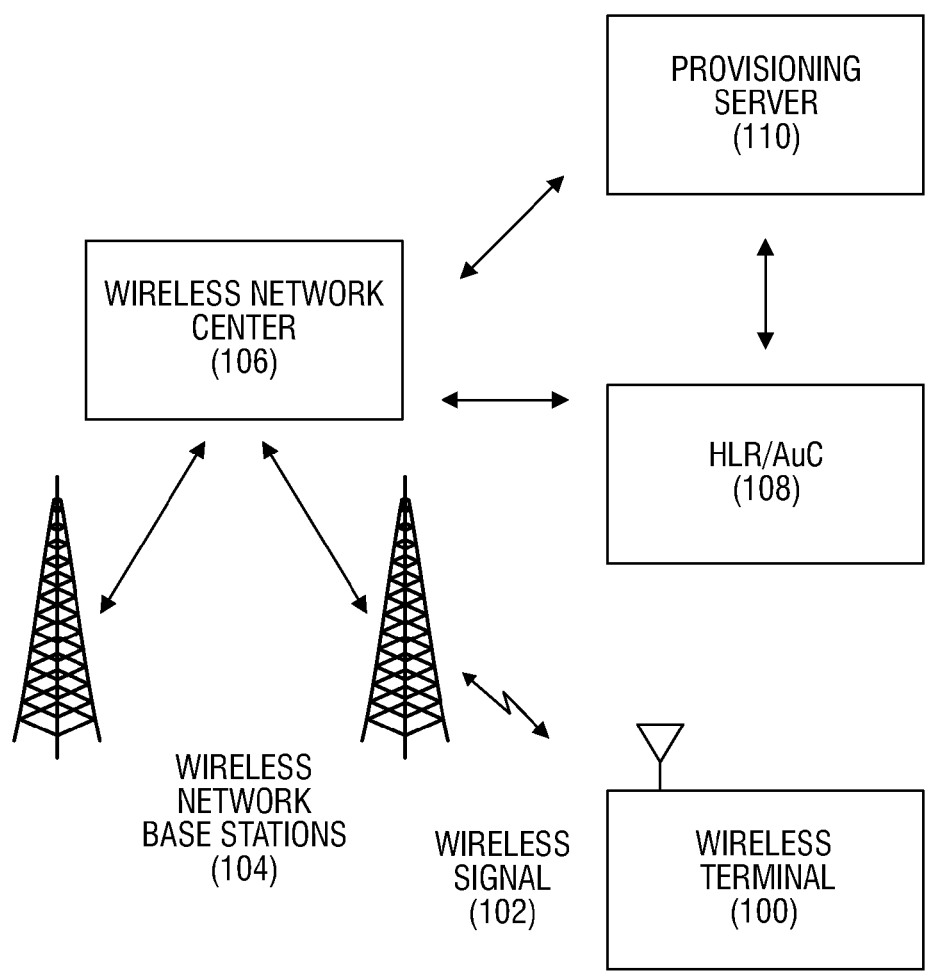
FIG. 1 illustrates an embodiment of a self-provisioning wireless system.

The invention can be implemented in numerous ways, including as a process, an apparatus, a system, a composition of matter, a computer readable medium such as a computer readable storage medium or a computer network wherein program instructions are sent over optical, electronic or wireless communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Provisioning of Subscriber Identifications to Wireless Terminals in Wireless Networks A system and method for provisioning a subscriber identification to a wireless terminal in a wireless network is disclosed. A control center (in which one or more control servers are located) receives transmission from a wireless network. The transmission indicates that a wireless terminal is roaming outside its home network. The control center provisions a new subscriber identification to the wireless terminal, where the subscriber identification is selected based at least in part on the identification of the visited wireless network in which the wireless terminal is roaming and a server database that provides prescribed subscriber identification(s) for a given visited network. Using the newly-provisioned subscriber identification, the wireless terminal acquires wireless service from the serving wireless network as a local wireless terminal or as a different visiting wireless terminal based on the server's prescription of subscriber identity for the particular visited network. The wireless terminal can operate as a local wireless terminal for that network, or for a network with which the home network of the new subscriber identity has a preferred relationship. The wireless terminal can acquire telecommunications service as a local or visiting terminal by using a stored set of authentication key-subscriber identification that is specific to the network it is operating in or the home network of the new subscriber identity. In various embodiments, the wireless terminal can operate as a local or visiting terminal by receiving or downloading a specific set of authentication key-subscriber identification, or by receiving or downloading a subscriber identification to pair with an existing authentication key.

FIG. 1 illustrates an embodiment of a wireless system. In the example shown, the wireless system includes a plurality of wireless terminals, represented in FIG. 1 by wireless terminal 100, a plurality of wireless network base stations, represented by wireless network base stations 104, wireless network center 106, Home Location Register/Authentication Center (HLR/AuC) 108, and provisioning server 110 capable of provisioning the wireless terminals. Although only one wireless network center 106 is shown, it is understood that the wireless system can include multiple wireless network centers 106. Each wireless network center 106 includes, or is associated with, a HLR, a Mobile Switching Center/Visitor Location Register (MSC/VLR), a Short Message Service Center (SMSC), and a Serving GPRS Service Node (SGSN), or Packet Data Serving Node (PDSN). In one embodiment, the multiple wireless centers 106 may be operated by different network carriers, while HLR/AuC 108 and provisioning server 110 are operated by a global platform provider i.e., a control center. Wireless terminal 100 includes a Subscriber Identity Module (SIM) which is either an attachable hardware card with a memory and a processor or a software object embedded in the wireless terminal. Wireless terminal 100 communicates with wireless network base stations 104 using wireless signal 102. As a wireless terminal moves around it communicates with different wireless base stations. Wireless network base stations 104 communicate with wireless network center 106.

Communications from a wireless terminal are passed to another wireless terminal over the same wireless network using a local wireless network base station to the other wireless terminal or the communications are carried by a wired network or other wireless network to the destination terminal. Wireless network center 106 communicates with its associated HLR, where sets of authentication key-subscriber identification are stored, to help in authenticating a wireless terminal that is acquiring wireless network service. One example of a subscriber identification is an international mobile subscriber identifier (IMSI). Wireless network center 106 and its associated HLR communicate with provisioning server 110 to enable a wireless terminal to acquire a new subscriber identification over the air (OTA) that is paired with an existing authentication key and/or a new set of authentication key-subscriber identification. In some embodiments the transmission of the authentication key or the authentication key-subscriber identification is encrypted. In various embodiments, the authentication key or the authentication key-subscriber identification is/are decrypted at the wireless terminal and/or in the SIM card. The old authentication key-new subscriber identification pair and/or the new set of authentication key-subscriber identification are added in the appropriate manner to the HLR/AuC 108 databases or the HLR databases associated with wireless network centers 106 so that the wireless terminal can be authenticated and can acquire wireless network service using the new subscriber identification and/or authentication key set. In various embodiments, the wireless network system is a cellular system, a GSM/GPRS wireless system, a CDMA or WCDMA wireless system, or a TDMA wireless system, or any other type of wireless network system.

Figure 2A:
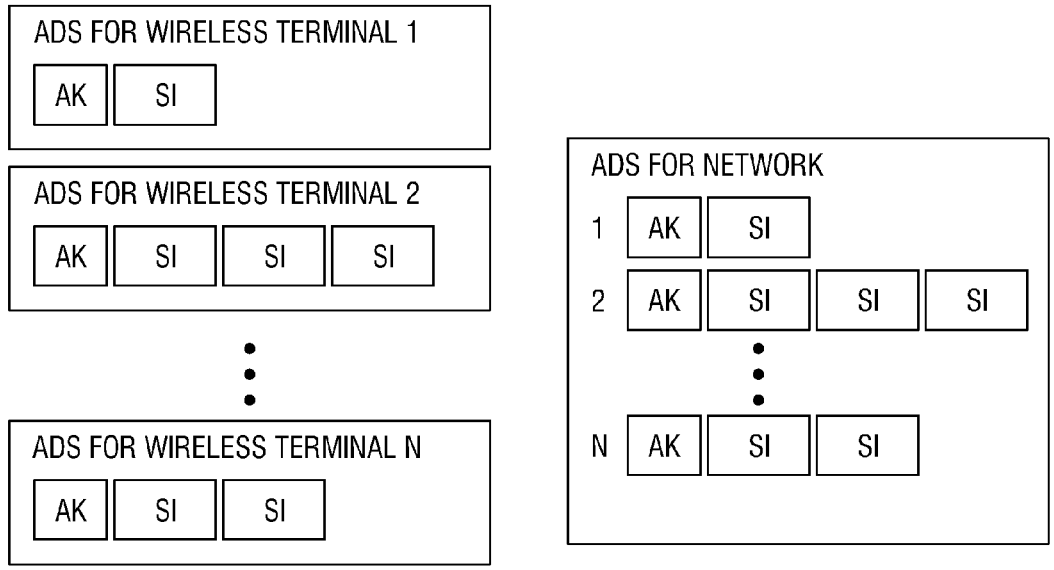
FIG. 2A illustrates an example of authentication data structures in one embodiment.

FIG. 2A illustrates an example of authentication data structures in one embodiment. In some embodiments, the authentication data structure for a wireless terminal is located in the SIM, and for the network in the HLR/AuC such as HLR/Auc 108 of FIG. 1 or the HLR associated with wireless network centers 106. An authentication data structure (ADS) for a wireless terminal includes an authentication key (AK) and one or more subscriber identifications (SI) and is used to help authenticate a wireless terminal for a wireless network. In the example shown, the ADS for wireless terminal 1 includes one authentication key and one subscriber identification. The ADS for wireless terminal 2 includes one authentication key and three subscriber identifications. The ADS for wireless terminal N includes one authentication key and two subscriber identifications. The ADS for network includes the authentication key-subscriber identification entries for each of the wireless terminals. Entries for wireless terminal 1, 2, and N are shown. In some embodiments, there are more than one authentication keys where each authentication key has multiple subscriber identifications.

Figure 2B:
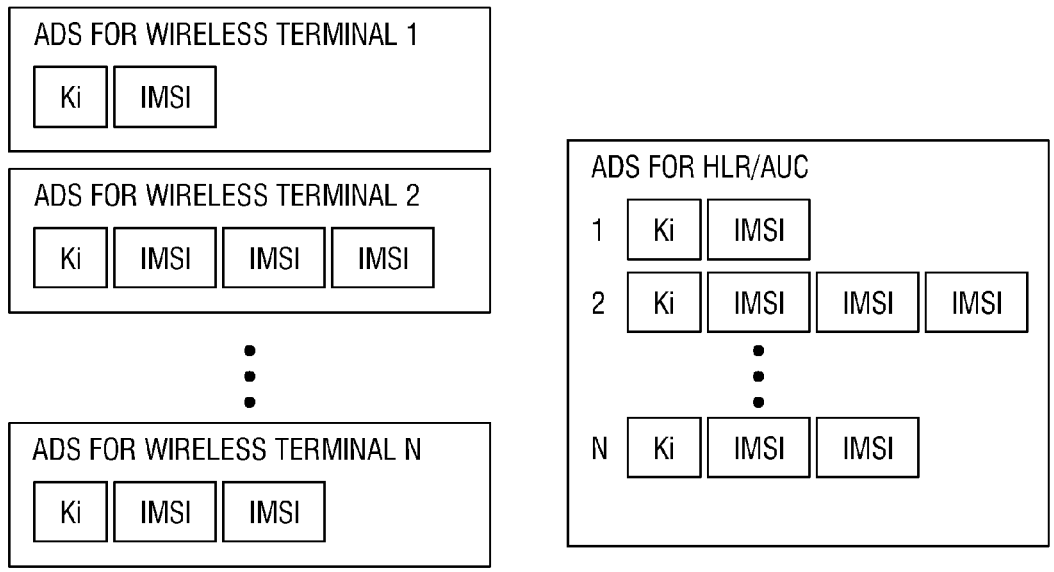
FIG. 2B illustrates an example of authentication data structures in another embodiment.

FIG. 2B illustrates an example of authentication data structures in another embodiment. Authentication data structure (ADS) for a wireless terminal includes a Ki and one or more IMSI's. In the example shown, the ADS for wireless terminal 1 includes one Ki and one IMSI. The ADS for wireless terminal 2 includes one Ki and three IMSI's. The ADS for wireless terminal N includes one Ki and two IMSI's. The ADS for HLR/AuC includes the Ki-IMSI entries for each of the wireless terminals. Entries for wireless terminal 1, 2, and N are shown.

Figure 3:
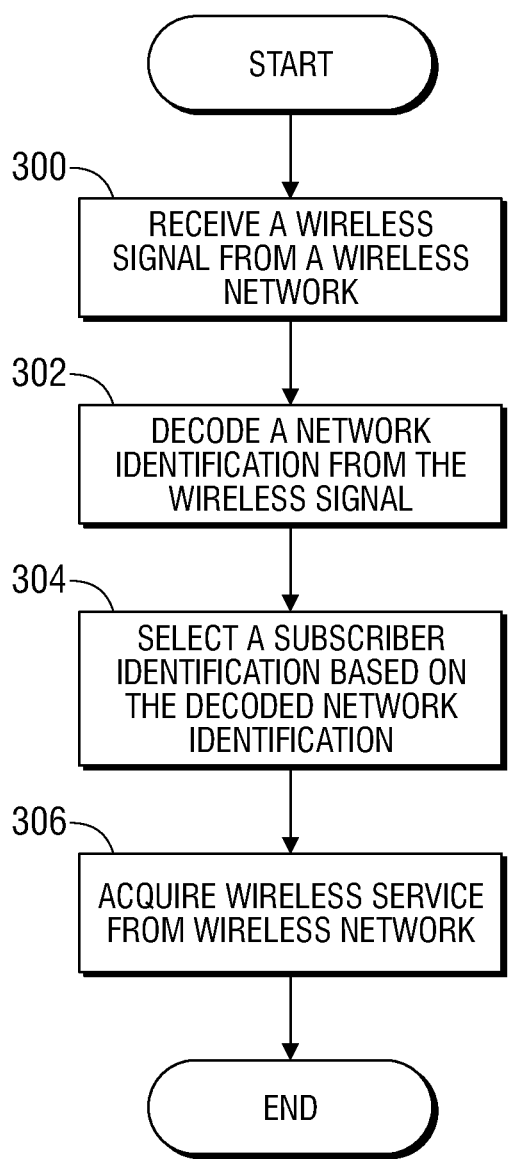
FIG. 3 is a flow diagram illustrating an embodiment of a process for acquiring wireless service from a wireless network.

FIG. 3 is a flow diagram illustrating an embodiment of a process for acquiring wireless service from a wireless network. In some embodiments, the process of FIG. 3 is implemented on a wireless terminal such as wireless terminal 100 in FIG. 1. In the example shown, in 300 a wireless signal is received from a wireless network. A wireless terminal receives wireless signals from a nearby network base station. In 302, a network identification is decoded from the wireless signal. The wireless signal includes a mobile network identification. For example, the wireless terminal scans for the existing wireless system signals. When it finds a network system broadcast control channel (e.g. BCCH in GSM Systems), it decodes the broadcasted information to decode the Location Area Identifier (LAI). The LAI is composed of a mobile country code, a mobile network code and a location area code. From the LAI, the wireless terminal can determine the country in which it is operating. In 304, a subscriber identification is selected based on the decoded network identification. For example, LAI information can be matched with the subscriber identification of the wireless terminal, which includes a mobile country code, a mobile network code, and a mobile subscriber identification number. In various embodiments, the LAI mobile country code and subscriber identification mobile country code are matched or the LAI mobile network code and the subscriber identification mobile network code are matched. In various embodiments, the selection of a subscriber identification is based at least in part on the pricing of different wireless networks, the billed account for that connection, a billed account for the wireless service, the application that will use the connection, an application using the wireless service (for example, one subscriber identification for data communication and a different subscriber identification for voice communication) or any other appropriate criteria for selecting a subscriber identification. In 306, wireless service is acquired from the wireless network.

Figure 4A:
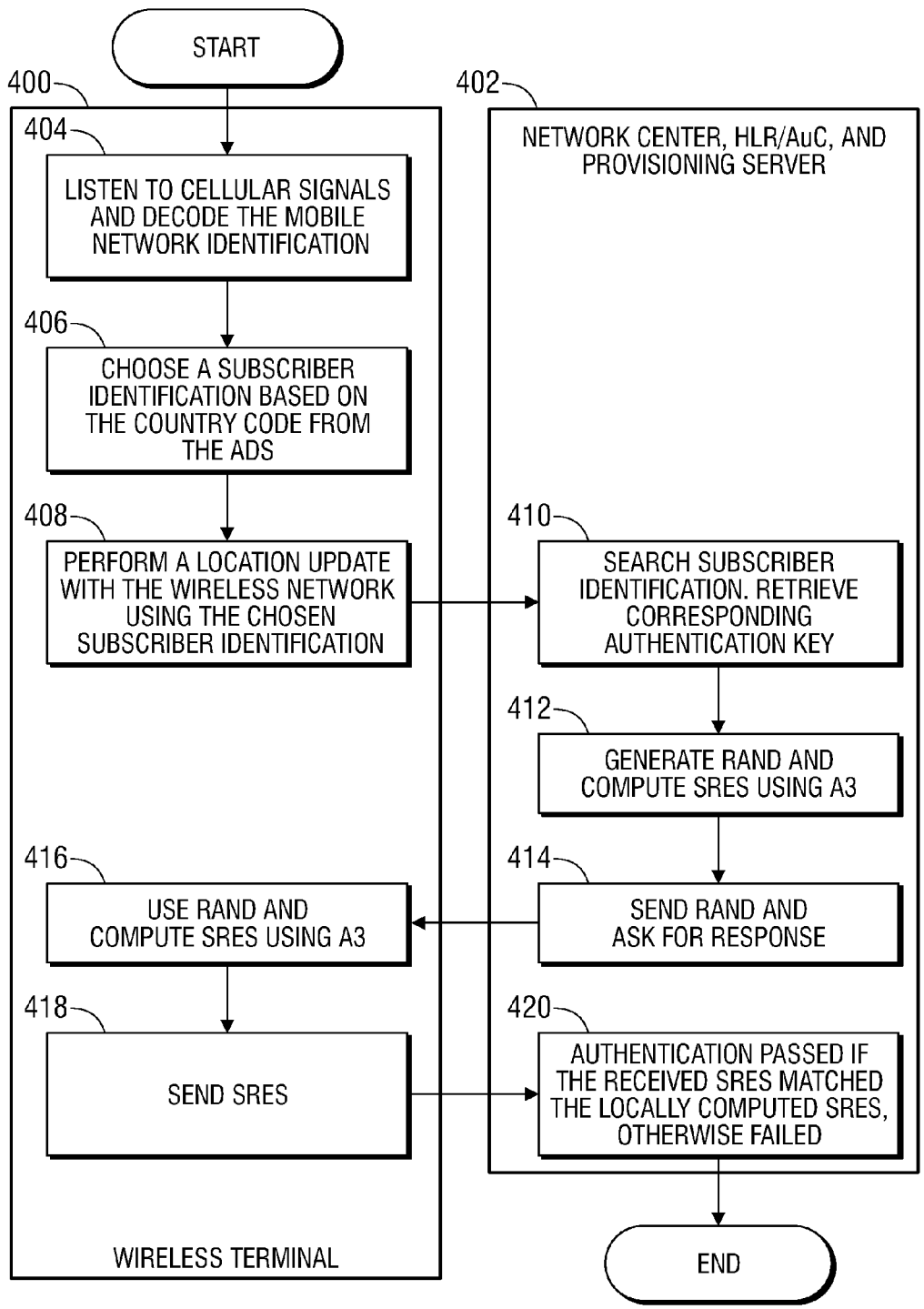
FIG. 4A illustrates an embodiment of a process for provisioning or authentication of a wireless terminal in a network system.
Figure 4B:
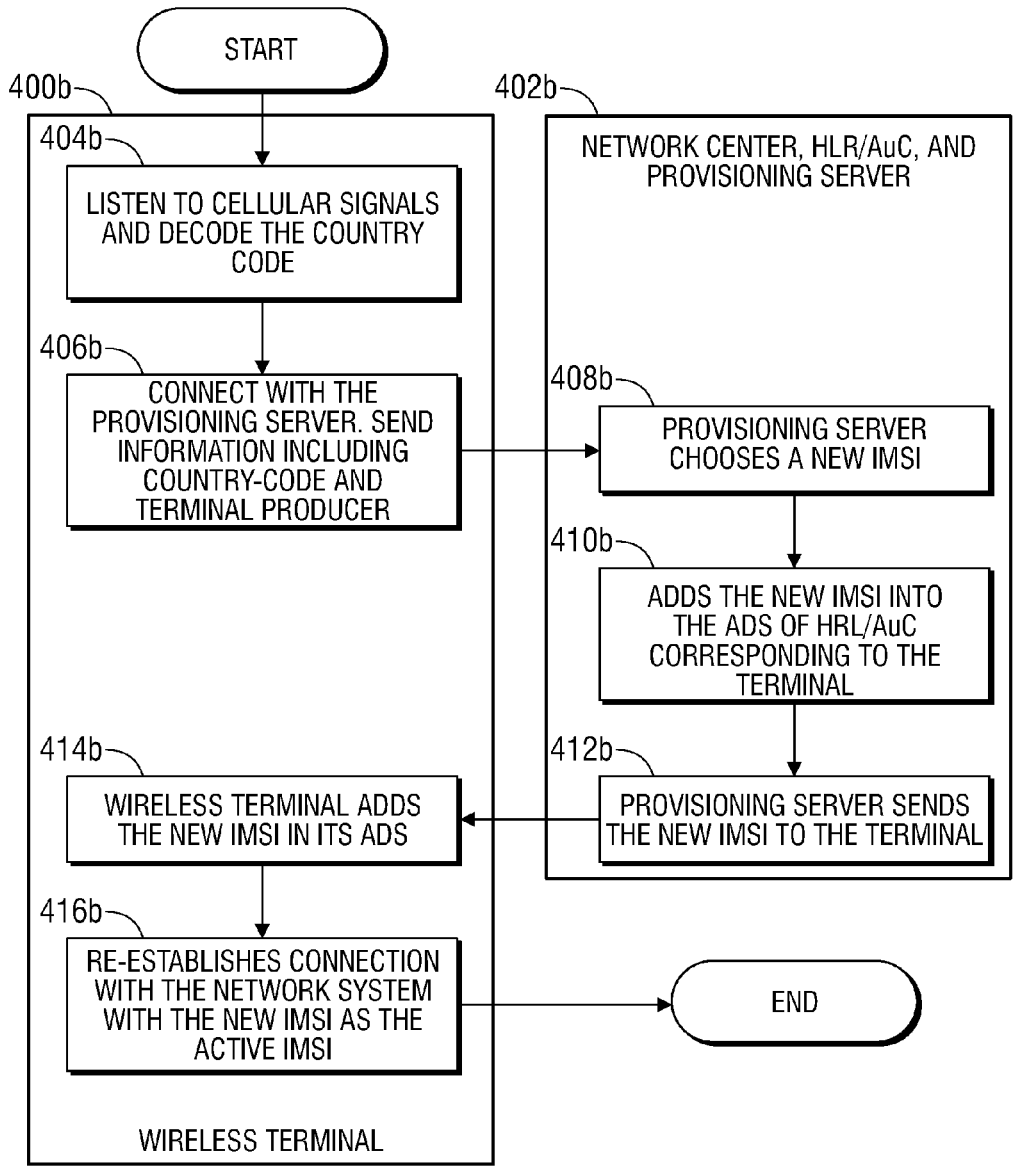
FIG. 4B illustrates another embodiment of a process for provisioning or authentication of a wireless terminal in a network system.

FIG. 4A illustrates an embodiment of a process for provisioning subscriber identification to a wireless terminal in a network system. Referring also to FIG. 1, in the example shown, wireless terminal 100 receives information from and transmits information to wireless network center 106 (and its associated HLR), HLR/AuC 108, and provisioning server 110 using wireless signals 102. As shown in FIGS. 4A and 4B, wireless network center 106 (and its associated HLR), HLR/AuC 108, and provisioning server 110 are collectively identified by numeral 402. In 404, wireless terminal 100 listens to wireless signals 102 transmitted from network base stations 104 and decodes the mobile network identification from the transmitted information. For example, the wireless terminal scans for the existing wireless system signals. When it finds a network system broadcast control channel (e.g. BCCH in GSM Systems), it decodes the broadcasted information to decode the Location Area Identifier (LAI). The LAI is composed of a mobile country code, a mobile network code and a location area code. From the LAI, the wireless terminal can determine the country in which it is operating. The wireless terminal receives a set of Subscriber Identification from network center, HLR/AuC, and provisioning server 402 and stores in its ADS. In 406, the wireless terminal chooses a Subscriber Identification with the same country code from its ADS. For example, the Subscriber Identification is composed of a mobile country code, a mobile network code, and mobile subscriber identification number. The codes in the Subscriber Identification can be used to match a Subscriber Identification to the local network and/or country. The rest of the Subscriber Identifications stored in the wireless terminal's ADS may be made inactive for the duration of the session.

In 408, the wireless terminal performs a location update with the visited wireless network using the new Subscriber Identification. In 410, the network center, HLR/AuC, and provisioning server 402 searches for the Subscriber Identification in its ADS and retrieves the corresponding Authentication Key. In 412, a challenge is generated (RAND) and with the Authentication Key is used to calculate a Response (SRES) using an authentication algorithm (A3). In 414, the RAND is sent to the wireless terminal and a response is requested. In 416, the wireless terminal uses the RAND with the Authentication Key from its ADS to independently calculate a SRES using encryption algorithm (A3) stored in its SIM. In 418, the SRES is sent to the network center and/or HLR/AuC and/or provisioning server 402. In 420, authentication is passed if the received SRES matches the locally computed SRES, otherwise the authentication fails.

FIG. 4B illustrates another embodiment of a process for provisioning subscriber identification to a wireless terminal in a network system. In some cases, the wireless terminal will not contain an IMSI that matches the country code of the local network system. The wireless terminal can connect to the network using an IMSI with another country code and then receiving or downloading a local IMSI (i.e. with a matching country code) or a new visiting IMSI. In the example shown, wireless terminal 400B receives information from and transmits information to the network center and on to the HLR/AuC of the home network of the currently active IMSI using cellular signals. The home network HLR/AuC transmits the network registration information of the roaming subscriber to the provisioning server 402B. In 404B, wireless terminal 400B listens to cellular signals transmitted from network towers and decodes the country code from the transmitted information. In 406B, wireless terminal 400B communicates with the HLR/AuC of the home network of the currently active IMSI and is authenticated. The home network HLR/AuC transmits the network registration information of the roaming subscriber to the provisioning server transmitting information including a visited country/network code and a terminal producer. In 408B, the provisioning server chooses a new IMSI with a local country/network code or other new country/network code. In 410B, the new IMSI is added to the ADS of the HLR/AuC (or the HLR associated with the network system) by the provisioning server corresponding to the wireless terminal (i.e. paired with the wireless terminal's Ki). In 412B, the provisioning server sends the new IMSI to wireless terminal 400B; OTA e.g., via a SMSC. In 414B, wireless terminal 400B adds the new IMSI to its ADS. In 416B, wireless terminal 400 reestablishes its connection with the network system with the new IMSI as the active IMSI. In some embodiments, depending on the information transmitted (i.e. IMSI range or type of wireless terminal), communication may be established between the wireless terminal and a specific application server (i.e., a global platform provider's provisioning server or another server). In some embodiments, this communication with a specific application server is encrypted.

Figure 5:
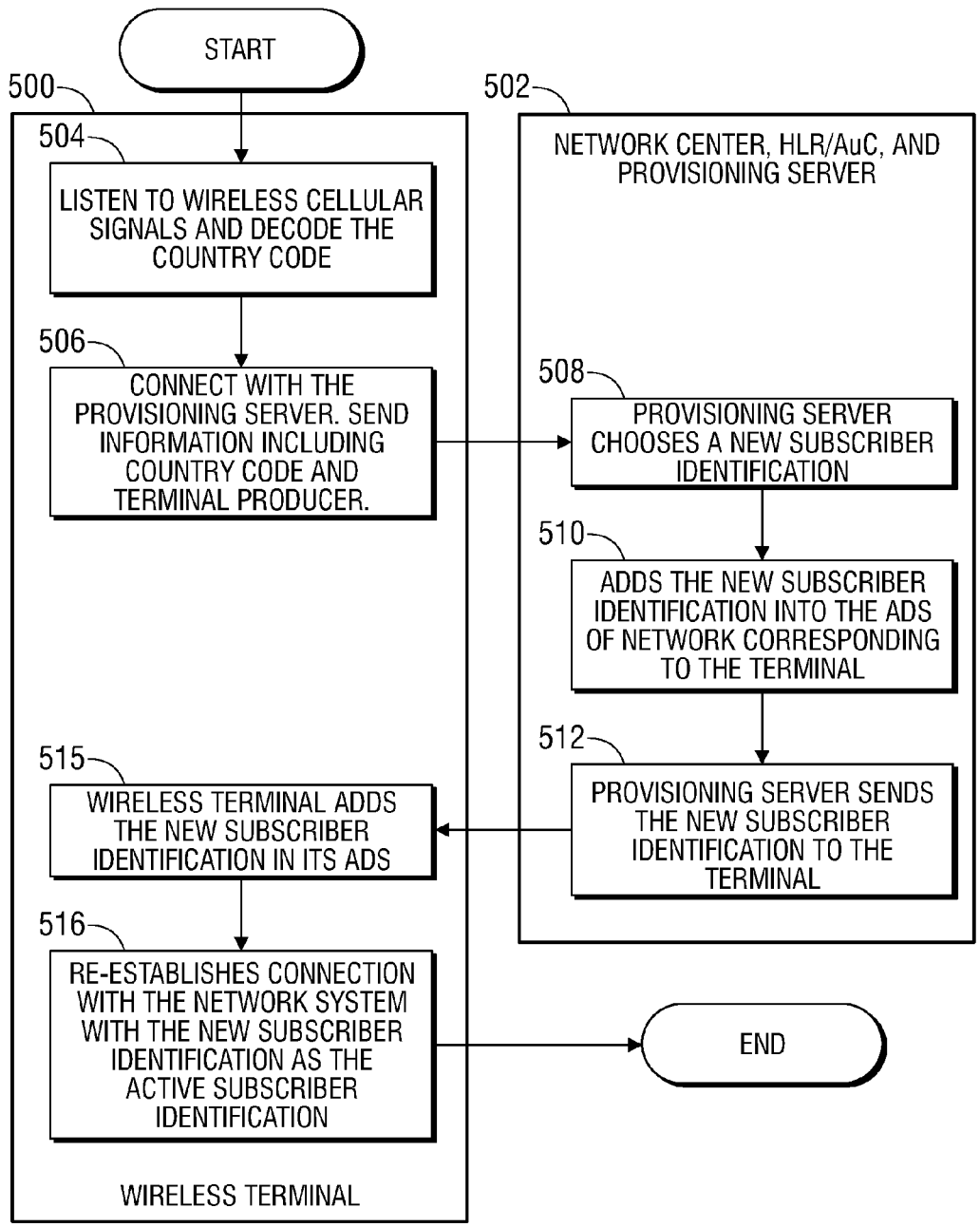
FIG. 5 illustrates an embodiment of a process for self-provisioning or authentication, of a wireless terminal in a network system.

FIG. 5 illustrates an embodiment of a process for provisioning subscriber identification to a wireless terminal in a network system. In some embodiments, the wireless terminal will not contain a Subscriber Identification that matches the network code and/or country code of the local network system. The wireless terminal can connect to the network using a Subscriber Identification with another network/country code and then receiving downloading a local Subscriber Identification (i.e. with a matching country code) or a new visiting Subscriber Identification. Referring also to FIGS. 1 and 4A, in the example shown, wireless terminal 100 receives information from and transmits information to network center 106 (and its associated HLR) and on to HLR/AuC 108 of the home network of the currently active Subscriber Identification. The home network HLR/AuC transmits the network registration information of the roaming subscriber to provisioning server 110. In 504, wireless terminal 100 listens to wireless signals transmitted from network base stations 104 and decodes the mobile network identification from the transmitted information similar to 404 of FIG. 4A. In 506, wireless terminal 100 communicates with the HLR/AuC of the home network of the currently active Subscriber Identification and is authenticated, using a process similar to 408-420 of FIG. 4A, with the provisioning server 110 transmitting information including a visited country/network code and a terminal producer. In 508, the provisioning server 110 chooses a new Subscriber Identification with a local country code and/or network code, or a new visiting Subscriber Identity. In 510, the new Subscriber Identification is added to the ADS of the HLR/AuC 108 or the HLR associated with the visited network corresponding to the wireless terminal (i.e. paired with the wireless terminal's Authentication Key). In 512, the provisioning server 110 sends the new Subscriber Identification to wireless terminal 500; OTA e.g., via a SMSC. In 515, wireless terminal 100 adds the new Subscriber Identification to its ADS. In 516, wireless terminal 100 reestablishes its connection with the network system with the new Subscriber Identification as the active Subscriber Identification. In some embodiments, depending on the information transmitted (e.g., subscriber identification range or type of wireless terminal), communication may be established between the wireless terminal and a specific application server (e.g., a global platform provider's provisioning server or another server). In some embodiments, this communication with a specific application server is encrypted.

Figure 6:
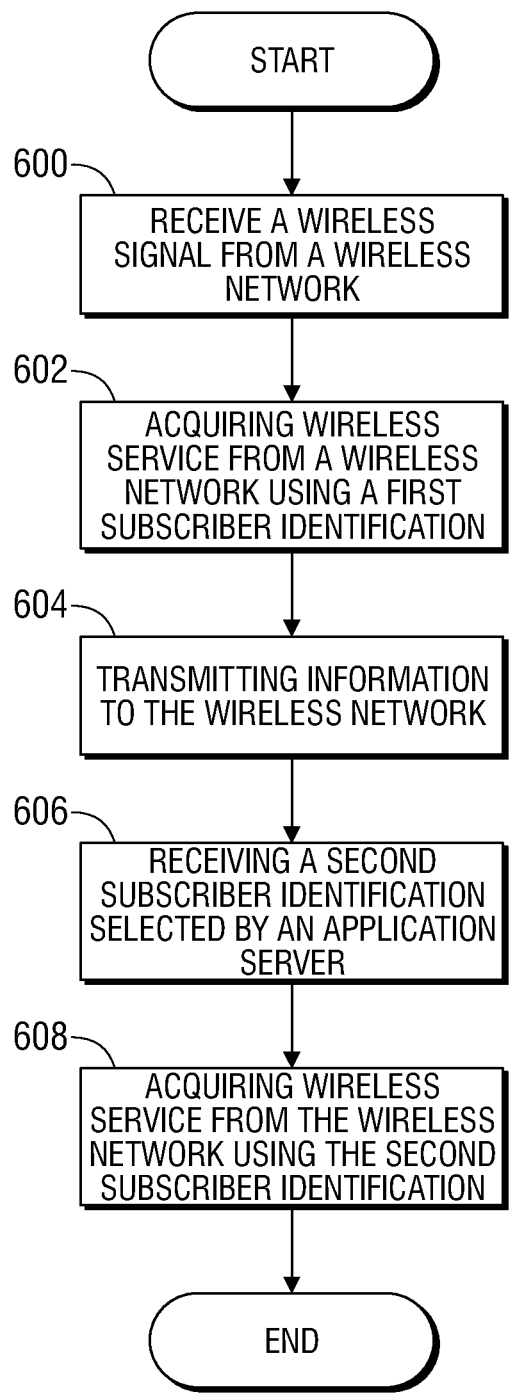
FIG. 6 is a flow diagram illustrating an embodiment of a process for acquiring wireless service from a wireless network.

FIG. 6 is a flow diagram illustrating an embodiment of a process for acquiring wireless service from a wireless network. In the example shown, in 600 a wireless signal is received from a wireless network. In 602, wireless service is acquired from the wireless network using a first subscriber identification. In 604, information is transmitted to the wireless network. In 606, a second subscriber identification, which is selected by an application server (or provisioning server 110 of FIG. 1), is received. The second subscriber identification is selected based at least in part on one or more of the following: the wireless network, the wireless network identification, the base station that the wireless terminal is communicating with, the local country associated with the network, or any other appropriate criteria for selecting a subscriber identification. In various embodiments, the first subscriber identification and the second subscriber identification are both paired with a single authentication key or the first subscriber identification is paired with a first authentication key and the second subscriber identification is paired with a second authentication key. In some embodiments, a second authentication key is received. In various embodiments, the subscriber identification and/or the authentication key are received after having been encrypted and need to be decrypted after having been received. In some embodiments, the subscriber identification is encrypted and decrypted using an authentication key. In various embodiments, a subscriber identification and/or a authentication key is encrypted in an application server, in a provisioning server, in a wireless network server, or in a combination of an application/provisioning server and a wireless network server, or in any other appropriate place for the encryption. In various embodiments, a subscriber identification and/or an authentication key is decrypted in a wireless terminal, in a SIM card, or in a combination of the SIM card and the wireless terminal, or in any other appropriate place for the decryption. In some embodiments, authentication information is received—for example, a random number that has been encrypted using an authentication key, a subscriber identification that has been encrypted using an authentication key, or other information that has been encrypted using an authentication key or other appropriate key. In 608, wireless service is acquired from the wireless network using the second subscriber identification.

Wireless Communication Provisioning Using State Transition or Allocation Rules

Wireless communication provisioning using state transition or allocation rules associated with an identifier is disclosed. A first state associated with one or more identifiers is defined. A second state associated with one or more identifiers is defined. A state transition or allocation rule is defined between the first and second states. In some embodiments, the one or more identifiers are stored in a subscriber identity module (SIM). In some embodiments, the one or more identifiers are IMSIs. In some embodiments, a plurality of states are defined, a plurality of state transition or allocation rules are defined, and a group of states and transition/allocation rules are selected and associated with one or more identifiers. In some embodiments, wireless communications comprise mobile data, mobile cellular communications, or any other appropriate wireless communications.

In some embodiments, a customer organization defines a sequence of states for devices that communicate data with a global platform provider's application server via one or more wireless carrier networks. The provider (e.g., the global platform provider) enables the communication via the wireless carrier networks. The plurality of states enables the activity of provisioning of a customer device or provider device used in the data communication with appropriate billing, access, and/or authorization for each activity especially with regard to testing, activation, deactivation, etc.

Figure 7:
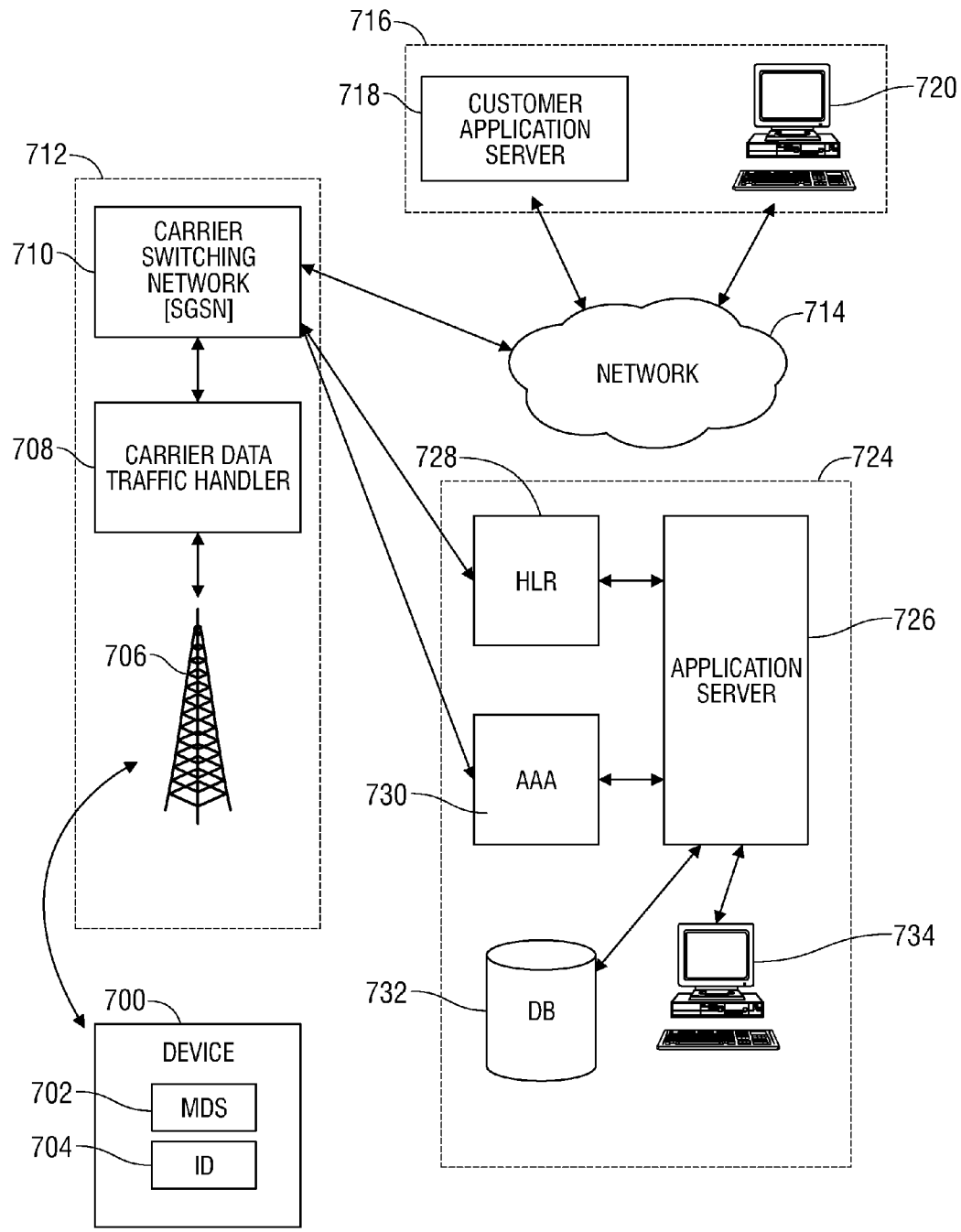
FIG. 7 illustrates a block diagram of an embodiment of a system for mobile data communication provisioning.

FIG. 7 illustrates a block diagram of an embodiment of a system for mobile data communication provisioning. In the example shown, device 700 comprises a mobile device that communicates data. Device 700 includes a mobile data service (MDS) 702—for example, general packet radio service—and an identifier (ID) 704—for example, a subscriber identifier (such as IMSI). Data can be transmitted and received by device 700 using MDS 702. Device 700 is identified using ID 704 and associated with a user or customer. Transmissions and receptions of data communicate with carrier network 712, which is associated with MDS 702. In various embodiments, the carrier network associated with MDS 702 comprises a mobile carrier network, a cell phone network, a messaging network, wireless communication network, or any other appropriate network for communicating data to a mobile device.

Carrier network 712 includes carrier switching network 710 (e.g., SGSN—serving General Packet Radio Services (GPRS) support node—used in Global System for Mobile Communications (GSM) networks), carrier data traffic handler 708 (e.g., GRX—a GPRS roaming exchange and/or SS7—signaling system 7 system), and a plurality of carrier towers—represented in FIG. 7 by tower 706. Communications of data traffic to and from device 700 are received by carrier network 712 by a carrier tower, which communicates the data traffic with carrier data traffic handler 708. Carrier data traffic handler 708 communicates data traffic with carrier switching network 710. Carrier switching network 710 can communicate with network 714, and Authentication Center/Home Location Register (HLR) 728 and Authentication, Authorization, and Accounting (AAA) Server (e.g., a Radius server) 730 of provider system 724. In one embodiment, provider system 724 is operated by a global platform provider as a control center.

Network 714 enables communication with customer system 716, which includes customer application server 718 and customer administrator 720. In some embodiments, network 714 comprises the internet, a local area network, a wide area network, a wired network, a wireless network, or any other appropriate network or networks for communicating with customer system 716. Customer application server 718 receives data from and transmits data to device 700 regarding the customer's services or products. In various embodiments, the customer's services includes transaction related services, monitoring services, and/or location tracking services. In some embodiments, a state transition rule or allocation defining transition from one provisioning state to another provisioning state associated with device 700 is implemented on customer application server 718. In some embodiments, a state transition or allocation rule defining transition from one provisioning state to another provisioning state associated with device 700 is not known to device 700.

Provider system 724 includes HLR 728, AAA server 730, application server 726, database (DB) 732, administrator 734. In an embodiment where the provider system 724 is the control center of a global platform provider, application server 726 can perform the function of a provisioning server, such as provisioning server 110 of FIG. 1, in addition to other functions. Provider system 724 enables customer services by enabling data communication services via the carrier network with device 700. HLR 728 enables communication with the provider system by indicating if device 700 is allowed to have data communication through carrier network 712 with customer system 716. AAA server 730 enables specific permissions that are available regarding data communications between device 700 and customer system 716 via carrier network 712. Application server 726 enables provisioning and billing for the provider. Provisioning comprises enabling devices such as device 700 to have mobile data communication services using a mobile carrier network. DB 732 includes information related to provisioning and billing for the provider. Administrator 734 administrates provider system. Customer system administrator 720 communicates with provider application server 726 to administrate customer system usage, billing, provisioning for data communication service of carrier network 712 enable by provider 724. In some embodiments, functionality of HLR 728 and AAA server 730 are performed by the same server, are partitioned between two servers but not exactly as described herein, or any other server configuration to achieve the same functionality.

FIG. 8 is a flow diagram illustrating an embodiment of a process for mobile data communication provisioning. In some embodiments, the process of FIG. 8 helps provision device 700 of FIG. 7 such that mobile data and/or wireless communications is available via carrier network 712 to customer system 716. In the example shown, in 800 states associated with one or more identifiers are defined. States that are associated with one or more identifiers can include test ready, inventory, activation ready, activated, deactivated, retired, return merchandise authorization (RMA), suspend, fraud review, purged, and/or any other appropriate states. In various embodiments, the identifier can be an International Circuit Card Identifier (ICCID), an international mobile subscriber identifier (IMSI), a customer identifier, a user identifier, or a device identifier. In various embodiments, the one or more identifiers comprises an identifier associated with a user, a customer, a company, an organization, etc. or a group of identifiers associated with a user, a customer, a company, an organization, etc.

In some embodiments, one or more states are based on the lifecycle of the service of a wireless communication device.

A test ready state can be used to allow a manufacturer to test a SIM, or a device with a SIM, and its network communication infrastructure before delivering the SIM, or device with a SIM, to an end user, a retail location, or a distributor. A test ready state can be a default state for a SIM that allows authentication and authorization with a global platform provider's HLR and AAA server, but does not have any billing associated with it. A SIM in a test ready state is able to conditionally transact data, voice, and/or Short Message Service (SMS) communications—for example, some limits may be placed on the communications while in this state such as: communication may occur up to a maximum data transmitted/received amount or up to a maximum number of days since the initial data communication. A test ready state may have no prerequisite state, have no limitation to a next state (e.g., all states allowed as next state), have no exclusivity rule, be a required state, and be allowed to have automatic and/or manual transitions.

An inventory state can be used to allow a SIM to be placed in a device and associated with an identifier of the device (e.g., a terminal identifier or a point of sale terminal identifier). An inventory state cannot coexist with an activation ready state. An inventory state cannot connect with the network and requires a manual change in order to change state. An inventory state may have a test ready state as a prerequisite, have no limitation to a next state (e.g., all states allowed as next state), have an exclusivity rule in that it cannot coexist with an activation ready state, not be a required state, and be allowed only to have manual transitions.

An activation ready state can be used to allow a SIM to be ready to be activated. An activation ready state will authenticate and authorize with the HLR and AAA server of the provider system, but no billing will occur. After the first data communication (e.g., first packet data protocol (PDP) context communication), the SIM state may automatically change to an activated state. An activation ready state may have a test ready state or inventory state as a prerequisite, have no limitation to a next state (e.g., all states allowed as next state), have an exclusivity rule in that it cannot coexist with an inventory state, not be a required state, and be allowed to have an automatic transition to an activated state or a manual transition to other states.

An activated state can be used to allow a SIM, or a device with a SIM, to be used by a user. In an activated state the SIM will authenticate and authorize on the HLR and AAA server of the provider system. Billing commences immediately on changing to this state. The provider system may check to make sure that the proper information is contained on the provider system's HLR and AAA server databases as well as the billing databases. In some cases, the checks will include checking the identifiers stored in the SIM (e.g., international mobile subscriber identifier (IMSI), customer identifier, device identifier, etc.). An activated state may have a test ready state, inventory, or activation ready state as a prerequisite, have possible next states of deactivated, purged, or retired, have no exclusivity rule, not be a required state, and be only allowed to have a manual transition to a next state.

A deactivated state can be used to allow a SIM, or a device with a SIM, to be deactivated by the user. In a deactivated state the SIM will not be allowed to authenticate and will not be billed. The AAA server of the provider system and the gateway GPRS support node (GGSN) of carrier networks will be sent a notification (e.g., a packet) informing them that the SIM has been deactivated. An deactivated state may have an activated state as a prerequisite, have possible next states of activated, purged, or retired, have no exclusivity rule, not be a required state, and be only allowed to have a manual transition to a next state.

A retired state can be used to allow a SIM, or a device with a SIM, to be retired by the provider or the user. In a retired state the SIM will not be allowed to authenticate and billing ends. A retired state may have any state as a prerequisite except purged, have any possible next states (i.e., all states possible), have no exclusivity rule, not be a required state, and be only allowed to have a manual transition to a next state.

A purged state can be used to allow a SIM, or a device with a SIM, to be purged by the provider. In a purged state the SIM will not be allowed to authenticate and the subscriber identification is removed from the system (e.g., IMSI permanently removed from the HLR of the provider system). A purged state may have any state as a prerequisite, have no possible next states, have no exclusivity rule, not be a required state, and be not allowed to have any transitions to a next state.

In some embodiments, a state is defined by a customer. In some embodiments, the state is defined using an Internet-based service.

In some embodiments, a state definition does not support communication sessions and a transition to that state will terminate existing open communication sessions.

In some embodiments, a first wireless communication provisioning state allows a communication device to pass traffic without incurring any billing charges, and an associated state transition rule allows an automated transition to a second provisioning state where the second provisioning state incurs billing charges. In some embodiments, a first wireless communication provisioning state allows a communication device to pass traffic without incurring any billing charges, and an associated state transition rule allows an automated transition to the second provisioning state, where the second provisioning state does not allow the communication device to pass traffic.

In 802, state transition or allocation rule(s) between two states is/are defined. A transition from one state to another may occur automatically on a predetermined condition or manually. If the transition is based on a condition is met (e.g., upon first data communication—packet data protocol context established), the state will automatically change from one to another (e.g., activation ready state to activated state). In various embodiments, the transition condition is based on one or more of the following: a predetermined amount of elapsed time since a prior state transition, an amount of service usage above a predetermined amount of service usage, one or more service signalings, or any other appropriate condition. In various embodiments, the condition is based on an exclusivity rule, a state rule, a communication data transfer, or any other appropriate condition. A manual change from one state to another requires an intervention directly from the provider system—for example, an action through a manager portal, by uploading a file to the SIM or device with the SIM, or an application programming interface (API) call.

In various embodiments, a state transition or allocation rule can be defined for an individual device or a group of devices, or different rules can be defined for different individual devices or different groups of devices, or any other appropriate combination as appropriate for meeting the needs of a supplier of devices.

In some embodiments, a group of states are defined and a group of transition/allocation rules are defined, and then a selection of states and transition/allocation rules are associated with one or more identifiers.

In some embodiments, a customer selects a state transition/allocation rule. In some embodiments, a customer defines a state transition/allocation rule. In various embodiments, the state transition/allocation rule is selected and/or defined using an Internet-based service, using a local program interface, or any other appropriate manner of selecting and defining a state transition rule.

In some embodiments, a state transition/allocation rule when activated terminates existing communication sessions.

FIG. 9 is a block diagram illustrating an embodiment of a state definition. In some embodiments, a state is associated with an identifier—for example, a SIM, a device identifier (e.g., an international mobile equipment identifier), a vendor identifier, or any other appropriate identifier. In the example shown, a state definition includes state name, state description, required state flag, prerequisite state, allowed next state(s), exclusivity rule, and transition mode(s) available that describe conditions allowing transitions between states. For example, a test ready state has: a) a state name of test ready; b) a state description of SIM is able to tested in its operation with the network by a manufacturer in a limited manner without being billed; c) a required state flag indicating that the test ready state is required; d) there is no prerequisite state for the test ready state; e) allowed next states from test ready are inventory, activation ready, activated, retired, or purged; f) there is no exclusivity rule for the test ready state; and g) the transition modes available are automatic to either an inventory state or an activation ready state based on an exclusivity rule or manual change.

FIG. 10 illustrates an embodiment of a state transition/allocation rule definition. In various embodiments, a state transition/allocation rule definition is associated with a state associated with an identifier or an identifier. In the example shown, a state transition/allocation rule definition includes current state, transition condition, state transitioned to, and transition description. For example, a SIM can be manually changed from an inventory state to an activation ready state when the device that the SIM is in is deployed by selling the unit to a retail customer, by having a service provider place the unit in the field, or by any other appropriate manner. For another example, a SIM can be automatically changed from an activation ready state to an active state when a PDP context is established and data is communicated to and from the SIM, or device with the SIM in it.

Figure 11:
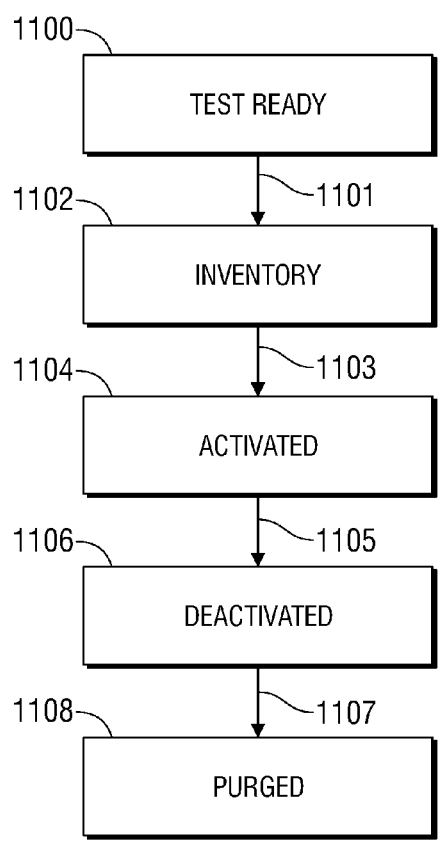
FIG. 11 is a flow diagram illustrating an embodiment of states of a channel sale model for provisioning and the transitions between the states.

FIG. 11 is a flow diagram illustrating an embodiment of states of a channel sale model for provisioning and the transitions between the states. In some embodiments, the starting default state of a SIM is the test ready state. In the example shown, in test ready state 1100 a device is ready for testing. The SIM is shipped in the test ready state to an original equipment manufacturer (OEM)—for example, a customer wanting to use the connectivity services provided by the provider which enables a user's device to have data communication to the customer via one or more carrier networks. In test ready state 1100, the SIM is allowed to provision and establish a PDP session (e.g., it can connect to GGSN of a carrier network, connect to internet, and connect to the customer's application server). When the SIM is in the test ready state, no billing to the OEM occurs. This connectivity is allowed for until the transition 1101. Transition 1101 from the test ready state is either a manually triggered transition or an automatically triggered based on a condition where the condition is the when the SIM has reached: 1) a maximum number of PDP sessions has occurred—for example, 10; 2) a maximum amount of data has been transmitted/received to and from the SIM/device via the carrier network—for example, 100 Kbytes; or 3) a maximum amount of time has elapsed since the first PDP context in this test ready state—for example, 90 days. When the transition is triggered, then the SIM switches to inventory state 1102.

In inventory state 1102, a device is waiting to be transferred to a user. In this state, no connectivity is enabled, and no billing occurs. The state is maintained until transition 1103. Transition 1103 occurs when the OEM or the customer or its channel service providers manually triggers a state change. When the state change is triggered, the SIM is changed to activated state 1104. In activated state 1104, a device is being used by user. In activated state 1104, the SIM is able to establish a PDP session and connect and transfer data to a customer application server via a carrier network. The user is billed for the service provided by the provider. Billing information is provided to the customer by gathering the relevant data from the network carriers and the provider's data bases. The SIM remains in the active state until triggered to transition. Transition 1105 may be triggered manually or automatically. In various embodiments, transition 1105 is triggered automatically by a maximum number of connections allowed, a maximum amount of data transferred, a maximum amount of time since the start of PDP sessions, or any other appropriate automatic trigger condition. In some embodiments, the user or the customer can also manually trigger transition 1105 to a deactivated state 1106.

In deactivated state 1106, a device is finished being used as requested by an end user or by a customer system request by being in a deactivated state. In deactivated state 1106, the SIM is not able to connect and establish a PDP session. While in deactivated state 1106, there is no billing for connectivity. Transition 1107 can be triggered automatically (e.g., after a period of time) or manually (e.g., by the customer). When transition 1107 is triggered, the SIM changes state to purged state 1108. In purged state 1108, the SIM and the device the SIM is in, is removed from the system. In purged state 1108, the SIM is not able to connect and establish a PDP session. There is no billing associated with the trigger or the state. Accounting for the customer may remove the item from inventory or asset lists. Purged state 1108 automatically removes the IMSI and International Circuit Card Identifier (ICCID) from the HLR of the provider system.

Figure 12:
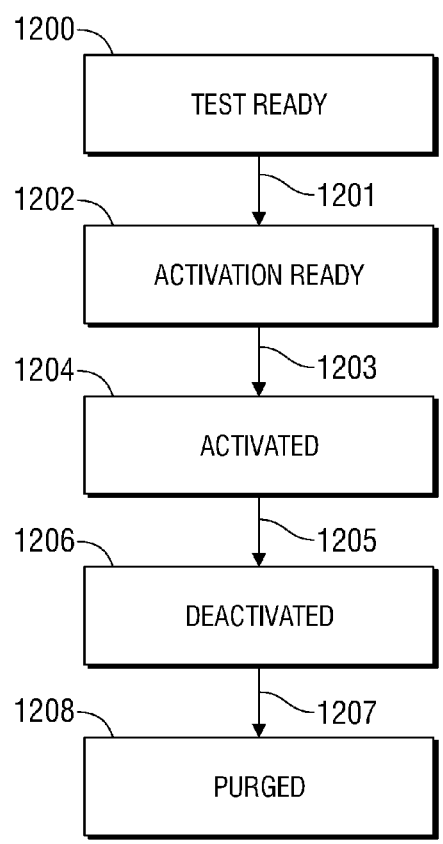
FIG. 12 is a flow diagram illustrating an embodiment of states of a retail sale model for provisioning and the transitions between the states.

FIG. 12 is a flow diagram illustrating an embodiment of states of a retail sale model for provisioning and the transitions between the states. The states and transitions in FIG. 12 are similar to the states and transitions in FIG. 11 except for the activation ready state. In some embodiments, the starting default state of a SIM is the test ready state. In the example shown, in test ready state 1200 a device is ready for testing. The SIM is shipped in the test ready state to an original equipment manufacturer (OEM)—for example, a customer wanting to use the connectivity services provided by the provider which enables a user's device to have data communication to the customer via one or more carrier networks. In test ready state 1200, the SIM is allowed to provision and establish a PDP session (e.g., it can connect to GGSN of a carrier network, connect to internet, and connect to the customer's application server). When the SIM is in the test ready state, no billing to the OEM occurs. This connectivity is allowed for until the transition 1201. Transition 1201 from the test ready state is either a manually triggered transition or an automatically triggered based on a condition where the condition is the when the SIM has reached: 1) a maximum number of PDP sessions has occurred—for example, 5; 2) a maximum amount of data has been transmitted/received to and from the SIM/device via the carrier network—for example, 1 Mbytes; or 3) a maximum amount of time has elapsed since the first PDP context in this test ready state—for example, 1 year. When the transition is triggered, then the SIM switches to activation ready state 1202.

In activation ready state 1202, a device is waiting to be transferred to a user. In various embodiments, the activation ready state is set after testing by the OEM when the device is being shipped from the OEM to retail locations, distribution partners, directly to end users, or when the SIM, or device with the SIM, is about to be in the end users hands but is not ready to have billing/service fully implemented. In this state, SIM connectivity is enabled, and a PDP session can be established. Upon the first PDP session occurring transition 1203 is triggered. When the state change is triggered, the SIM is changed to activated state 1204. In activated state 1204, a device is being used by user. In activated state 1204, the SIM is able to establish a PDP session and connect and transfer data to a customer application server via a carrier network. The user is billed for the service provided by the provider. Billing information is provided to the customer by gathering the relevant data from the network carriers and the provider's data bases. The SIM remains in the active state until triggered to transition. Transition 1205 may be triggered manually or automatically. In various embodiments, transition 1205 is triggered automatically by a maximum number of connections allowed, a maximum amount of data transferred, a maximum amount of time since the start of PDP sessions, or any other appropriate automatic trigger condition. In some embodiments, the user or the customer can also manually trigger transition 1205 to a deactivated state 1206.

In deactivated state 1206, a device is finished being used as requested by an end user or by a customer system request by being in a deactivated state. In deactivated state 1206, the SIM is not able to connect and establish a PDP session. While in deactivated state 1206, there is no billing for connectivity. Transition 1207 can be triggered automatically (e.g., after a period of time) or manually (e.g., by the customer). When transition 1207 is triggered, the SIM changes state to purged state 1208. In purged state 1208, the SIM and the device the SIM is in, is removed from the system. In purged state 1208, the SIM is not able to connect and establish a PDP session. There is no billing associated with the trigger or the state. Accounting for the customer may remove the item from inventory or asset lists. Purged state 1208 automatically removes the IMSI and International Circuit Card Identifier (ICCID) from the HLR of the global platform provider system.

Figure 13:
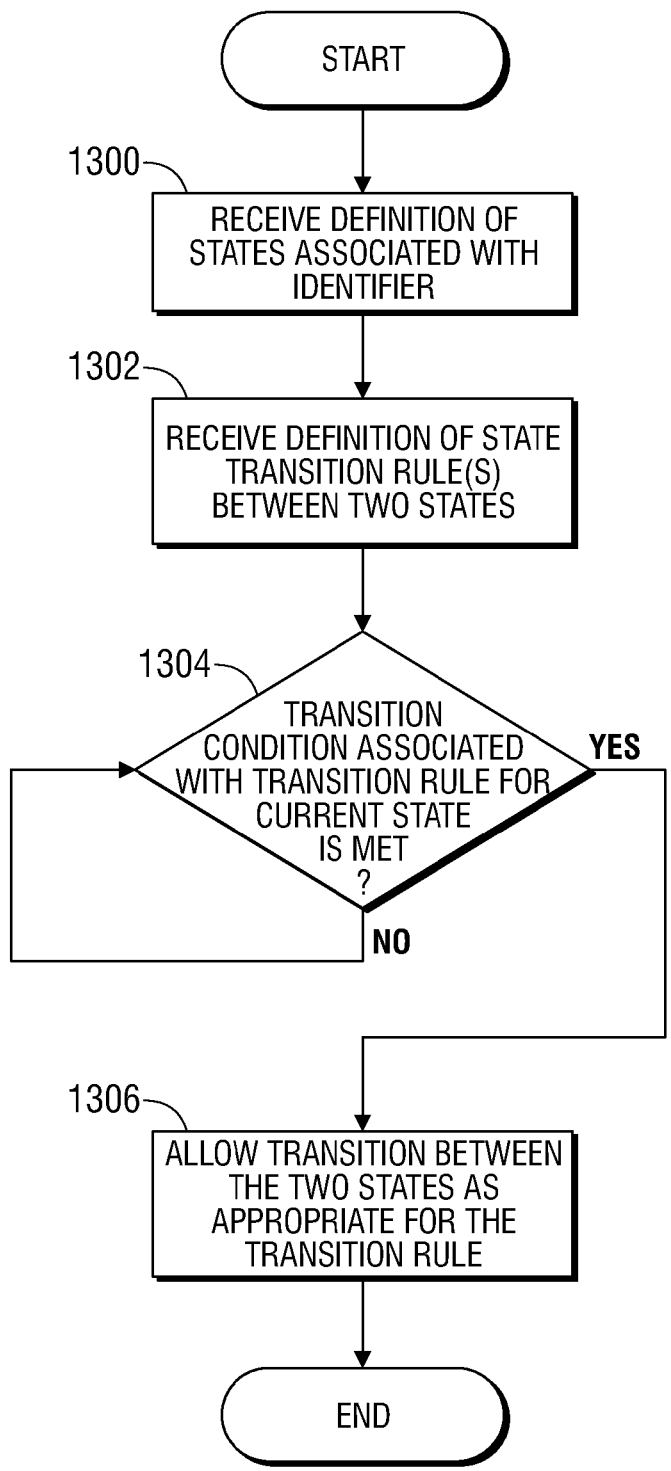
FIG. 13 is a flow diagram illustrating an embodiment of a process for provisioning wireless communication.

FIG. 13 is a flow diagram illustrating an embodiment of a process for provisioning wireless communication. In the example shown, in 1300 definitions for states associated with an identifier are received. In some embodiments, state definitions and/or selections are received using an internet-based application. In various embodiments, state definitions are the same or different for different identifiers. In various embodiments, a state for provisioning (e.g., a device) allows billing, allows communication sessions, allows activation, does not allow billing, does not allow communication sessions, does not allow activation, or any other appropriate action associated with a state. In 1302, definition(s) for state transition rule(s) between two states is/are received. In some embodiments, state transition rule/allocation definitions and/ or selections are received using an internet-based application. In various embodiments, the transitions are automatic or manual and are triggered with a transition condition. In various embodiments, the automatic and/or manual transition conditions include an elapsed time from a prior state, prior transition, or prior specific/any communication, an absolute time, an absolute date, after a predetermined amount of traffic, before a predetermined level of traffic is reached, after communication with a specific location, number, device, service center, after sending a service indication, a system message, after receipt of a service message, condition, communication from a specific location, device, server, service center, or any other appropriate transition condition. In 1304, it is determined if a transition condition associated with a transition rule for current state is met. In the event that an appropriate transition condition has not been met, control stays with 1304. In the event that an appropriate transition condition is met, then in 1306 allow transition between the two states as appropriate for the transition rule. In some embodiment, the implementation of provisioning states, state transition rule enforcement, and evaluation of transition conditions takes place on a server that communicates with a wireless network and wireless device. In one embodiment, the server is located in, or otherwise operated by, a global platform provider's control center.

A Global Platform for Managing Subscriber Identity Modules

A global platform for managing subscriber identity modules (SIMs) of wireless devices is described. The global platform provides a business support system (BSS) and operational support system (OSS) for a wide range of network carriers that may be operating in different countries or continents. The global platform allows partner carriers to deliver wireless communication services to the customers in a seamless way to the customers regardless of their geographical locations. Through an alliance agreement that each partner carrier enters with the global platform provider, a mobile device purchased from one partner carrier can freely move to an area (e.g., country or continent) operated by another partner carrier while incurring minimal (if any) performance impacts and roaming charges.

As described herein a mobile device may be a cell phone, an eBook, an automobile with wireless tracking ability, a digital picture frame, a game console, a tablet computer, a laptop computer, or other portable wireless communication devices. Further, the customers described herein may be an end consumer, an organization or an enterprise that has an interest in the global deployment of network-connected devices. In a conventional wireless system, the operation of every network carrier is bound by the country. Thus, a device (e.g., an automobile) purchased in one country cannot be easily shipped to another country without incurring permanent roaming charges in that other country. Further, since the automobile is roaming in the other country, its data traffic will be routed through its home network for both inbound and outbound signals and data transmission. This routing has a negative performance impact on the wireless communication. The global platform described herein allows such deployment to happen with minimal (if any) impact on the performance and roaming charges.

Figure 14A:
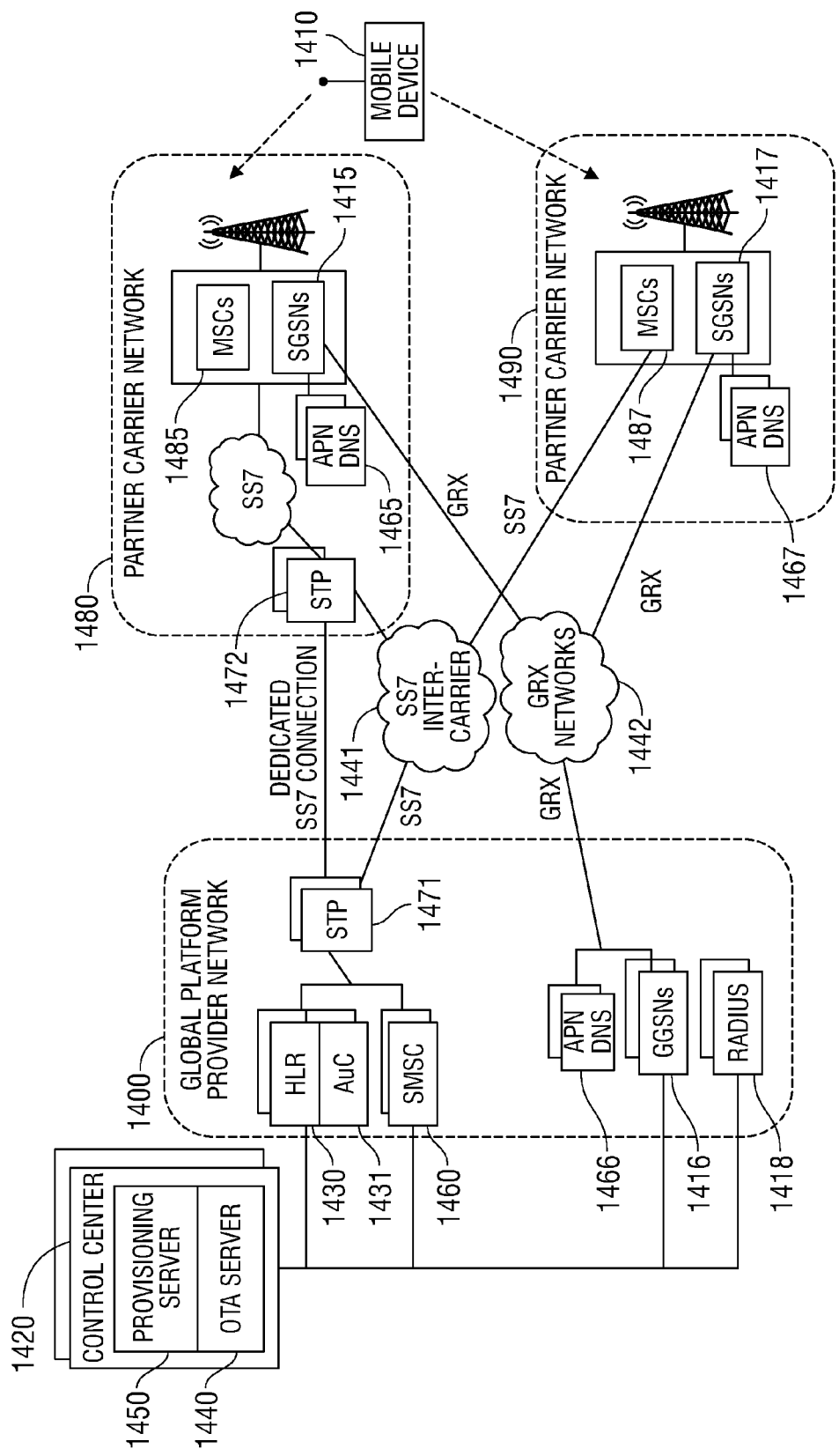
FIG. 14A is an embodiment of a wireless network architecture in which a global platform provider operates.

FIG. 14A is an embodiment of a wireless network architecture in which a global platform provider operates. The global platform provider is allocated with a set of multiple subscriber identifiers, such as the international mobile subscriber identifier (IMSIs). Although IMSI is used in the following description, it is understood that other subscriber identifier types can be used instead of IMSI. Moreover, although the wireless network architecture is described in the context of 2/3G Global System for Mobile Communication (GSM) network technology, it is understood that other network technologies, such as Code Division Multiple Access 2000 (CDMA2000), 4G Long Term Evolution (LTE), LTE Advanced, etc., can be used to support the techniques described herein. It is also understood that embodiments of the invention can be adapted to work with future versions of the network protocols, technologies and standards as these protocols, technologies and standards develop.

A mobile device 1410 having one of these IMSIs programmed in its SIM can avoid or reduce its roaming charges in regions that are operated by network carriers partnered with the global platform provider. The mobile device 1410 may incur temporary roaming charges after leaving its home network and entering a partner carrier network (e.g., partner carrier network 1480 or 1490). However, at some point in time when one or more pre-determined allocation rules are satisfied, the mobile device 1410 can be provisioned with a new IMSI that is local to the partner carrier network or an IMSI that is predetermined by the global platform provider to be preferred for that visited country. With this new IMSI, the mobile device can transmit and receive wireless packets in the partner carrier network without incurring roaming charges and without having the transmissions routed through its home network.

The determination of whether the mobile device 1410 can switch to a local or otherwise preferred IMSI can be made by a control center 1420 based on a set of allocation rules. The control center is coupled to a global platform provider network 1400 and includes at least a provisioning server 1450 and an over-the-air (OTA) server 1440. Both the control center 1420 and the global platform provider network 1400 are operated by the global platform provider. The control center 1420 and the global platform provider network 1400 can include multiple servers, multiple storage devices and multiple network nodes distributed across multiple geographical areas.

In one embodiment, the global platform provider network 1400 includes a Home Location Register (HLR) 1430 that includes one or more servers and databases for managing and storing mobile subscriber information. The mobile subscriber information includes the International Mobile Subscriber Identity (IMSI), the MSISDN, location information (e.g., the identity of the currently serving Visitor Location Register (VLR) to enable the routing of mobile-terminated calls) and service subscription and restrictions. The HLR 1430 is coupled to an authentication center (AuC) 1431 for performing authentication of a mobile device that requests a network connection.

The HLR 1430 is operated and updated by the global platform provider. The HLR 1430 communicates with the partner carrier networks (1480, 1490) via Signaling System 7 (SS7) messages through Signal Transfer Points (STPs) (1471, 1472), or via Internet Protocol (IP) messages through Mobility Management Entities (MMEs). The SS7/IP messages can be sent via dedicated SS7/IP connections and/or SS7/IP inter-carrier networks 1441. In some embodiments, the HLR 1430 shown herein is a logical representation. Physically, the HLR 1430 can be distributed across multiple geographical areas. In some embodiments, the HLR 1430 can include distributed segments of the HLRs owned by multiple partner carriers. Thus, in these embodiments the HLR 1430 can be the sum of multiple HLR segments, with each HLR segment owned by a different partner carrier. For example, a partner carrier may own and operate an HLR, and a segment of the HLR can be read and updated by the global platform provider. The updates performed by the global platform provider can include adding/provisioning and removing/purging IMSIs, and setting and editing subscriber wireless service permissions. The IMSIs that can be added and removed by the global platform provider are within a set of IMSIs that are allocated to the global platform provider. That is, the HLR 1430 stores and manages the IMSIs that belong to the set of IMSIs allocated to the global platform provider. In one embodiment, when a new IMSI is provisioned to a subscriber, the subscriber may also be changed to a new billing account owner. That is, the contractual ownership for the subscriber's wireless service may change with the provision of a new IMSI. After the provision of a new IMSI, the subscriber may receive a billing statement from a new partner carrier in addition to or instead of the original carrier.

In the embodiment of FIG. 14A, each of the partner carrier networks (1480, 1490) includes one or more MSCs (1485, 1487) and one or more SGSNs (1415, 1417). The MSCs (1485, 1487) are responsible for routing circuit-switched voice calls, fax, data and short message service (SMS). The MSCs (1485, 1487) can forward outgoing circuit-switched signals from a mobile device to a circuit-switched network (not shown), and can forward outgoing short messages to an SMS center (SMSC) 1460. The circuit-switched network and the SMSC 1460 then deliver the signals/messages to their intended destinations. In addition, the MSCs (1485, 1487) are responsible for requesting the HLR 1430/AuC 1431 to authenticate a mobile device when the mobile device requests for a network connection.

The SGSNs (1415, 1417) are responsible for routing data packets. Each SGSN (1415, 1417) is identified by an Access Point Name (APN), which can be used in a Domain Name System (DNS) query to resolve the IP address of a GGSN (e.g., GGSN 1416) that serves the SGSN (1415, 1417). The APN resolution function is shown as the APN DNS (1465, 1467). The GGSN 1416 then delivers outgoing data packets from the mobile device 1410 to their destination(s) via a packet-switched network (e.g., the Internet). Before granting access to the packet-switched network, the GGSN 1416 can use Remote Authentication Dial In User Service (RADIUS) protocol to provide Authentication, Authorization, and Accounting (AAA) management (shown as RADIUS 1418). For incoming data packets destined for the mobile device 1410, the GGSN 1416 resolves the IP address of the destination SGSN using the SGSN's APN in a DNS query (shown as the APN DNS 1466). The communication between the SGSN (1415, 1417) and the GGSN 1416 can be provided by a GPRS roaming exchange (GRX) network 1442 for inter-carrier connections. In some embodiments, the communication between the SGSN (1415, 1417) and its associated GGSN can be provided by an intra-carrier connection.

In the embodiment of FIG. 14A, the HLR 1430, the SMSC 1460, the GGSNs 1416 and the RADIUS 1418 are within the global platform provider network 1400. In alternative embodiments, one or more of the HLR 1430, the SMSC 1460, the GGSNs 1416 and the RADIUS 1418 can be located within and operated by one or more of partner carrier networks (1480, 1490). Regardless of their locations and ownership, the control center 1420 has access to each of the HLR 1430, the SMSC 1460, the GGSNs 1416 and the RADIUS 1418 to manage the information of the mobile subscribers, who directly or indirectly (e.g., through a partner carrier, or through a customer organization having a contract with a partner carrier or with the global platform provider) subscribes to the service of the global platform provider.

In some embodiments, the IMSIs allocated to the global platform provider belong to a set of IMSIs that contain one or more contiguous or non-contiguous segments of IMSIs. An IMSI is a unique non-dialable number allocated to each mobile device in the GSM system. The IMSI is stored in the SIM of a mobile device and uniquely identifies a subscriber identity. Generally, an IMSI includes three parts: (1) the mobile country code (MCC) consisting of three digits for identifying a country, (2) the mobile network code (MNC) consisting of two or three digits for identifying a network carrier, and (3) the mobile subscriber identity number (MSIN) consisting of nine to ten digits.

In one embodiment, the IMSIs allocated to the global platform provider can have an MCC and an MNC that identify a country and one of the partner carrier networks, as well as an MSIN that includes one or more digits having one or more pre-designated values. As an example, suppose that the MCC "123" and the MNC "956" identify a country and a partner carrier network "PN" operated within that country, respectively. Further suppose that the partner carrier agrees that among all of the IMSIs identifying the partner carrier network "PN", those IMSIs with the first digit of the MSIN being 9 (or any other pre-designated value) are allocated to the global platform provider. Thus, the IMSI 123-456-9xxxxxxxx indicates a range of IMSIs allocated to the global platform provider, with "x" being any value from 0-9. This range of IMSIs can be provisioned by the control center 1420 to mobile devices that roam into the partner carrier network "PN" and need to be switched to local or otherwise preferred IMSIs. Since the global platform provider can enter into agreements with multiple partner carriers, the IMSIs allocated to the global platform provider can include many disjoint ranges.

The MISN is to be distinguished from the Mobile Station International Subscriber Directory Number (MSISDN). The MSISDN is a dialable number that a caller uses to reach a mobile device. Generally, the HLR stores the IMSI and the MSISDN as a pair for identifying a mobile subscriber's device and for routing calls to the mobile subscriber. A SIM is uniquely associated to an IMSI, while the MSISDN can change in time (e.g. due to portability of phone numbers).

When a network carrier orders mobile devices from its equipment suppliers, the equipment suppliers typically pre-program each SIM in the mobile device with one or more IMSIs. In one embodiment, the pre-programmed SIM includes a bootstrap IMSI, which is one of the IMSIs allocated to the global platform provider. This bootstrap IMSI also identifies a country and a carrier network that is the home to the pre-programmed SIM. When an end user purchases a mobile device through any partner carrier channel, the service representative creates a service order to enter the end user's subscription information, including the MSISDN, using the bootstrap IMSI as a key. This service order with the key is submitted to the control center 1420, which creates a subscription record that uses the bootstrap IMSI as the key, and adds the subscription record to the HLR 1430. The mobile device can then start wireless communications using the bootstrap IMSI within its home network or a partner carrier network.

Figure 14B:
FIGS. 14B and 14C are two examples of IMSI switching when a mobile device roams from a home network to a visited network.
Figure 14C:
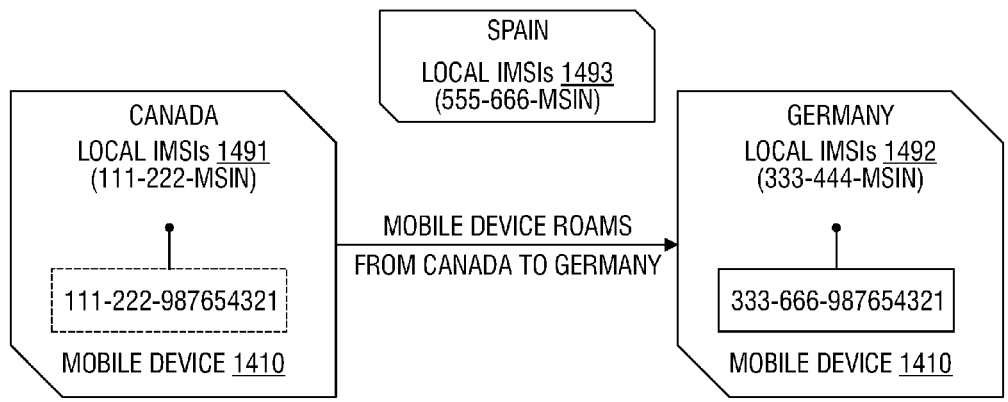

FIGS. 14B and 14C are two examples of IMSI switching according to embodiments of the invention. Referring to FIG. 14B, when the mobile device 1410 roams from its home network (e.g., in Canada) to a visited network (e.g., in Germany), it can be provisioned with a new IMSI by the global platform provider. For example, suppose that local IMSIs 1491 of the home network in Canada are (111-222-MSIN) and local IMSIs 1492 of the visited network in Germany are (333-444-MSIN), where MSIN represents any 9-10 digital number. In one embodiment, when the mobile device 1410 roams from Canada to Germany, the mobile device 1410 can be provisioned with a new IMSI that is one of the local IMSIs 1492 in Germany allocated to the global platform provider. In another embodiment, when the mobile device 1410 roams from Canada to Germany, the mobile device 1410 can be provisioned with a new IMSI that is one of the local IMSIs 1493 in Spain (e.g., 555-666-MSIN) allocated to the global platform provider. This new IMSI (one of the local IMSIs 1493) is herein referred to as a "preferred" IMSI for the visited network. The provision of a preferred IMSI may occur if; e.g., the global platform provider has an agreement with the Spanish network carrier to allocate its IMSIs 1493 to roaming devices in Germany that have subscribed to the service of the global platform provider.

In the example shown in FIGS. 14B and 14C, the MSIN portion of the IMSI before and after roaming is the same (e.g., 987654321) wherein the leading digit "9" indicates that the IMSI is allocated to the global platform provider. However, it is understood that the global platform provider can provision another available MSIN that is different from 987654321 to its roaming devices.

Figure 15:
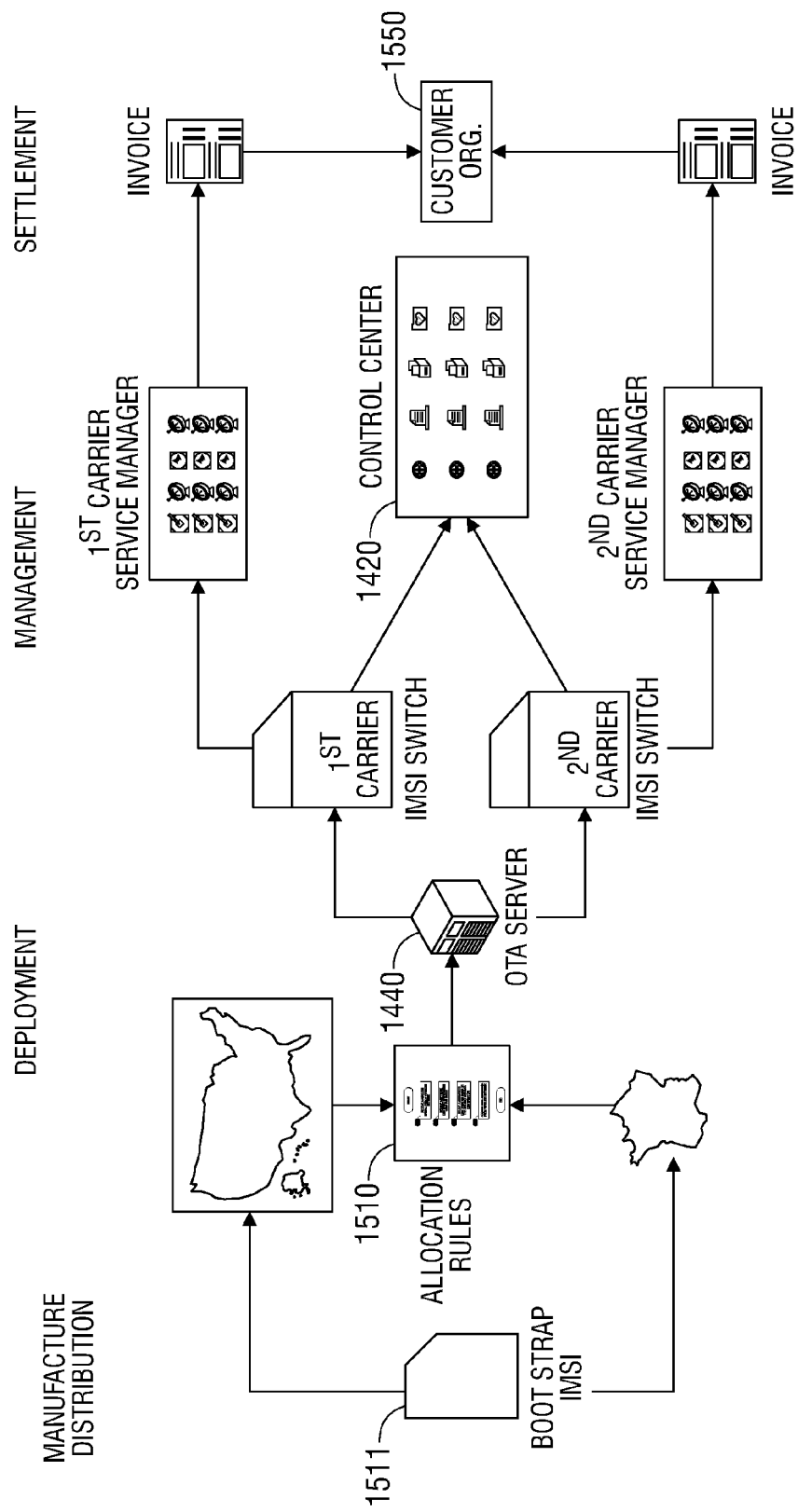
FIG. 15 illustrates an overview of IMSI provisioning and management.

FIG. 15 illustrates an overview of IMSI provisioning and management. Initially, a mobile device with a bootstrap IMSI 1511 is deployed from its home network to a deployed location. The home network is identified by the mobile country code (MCC) and the mobile network code (MNC) of the bootstrap IMSI 1511. The deployed location, which is in a network operated by one of the partner carriers or operated by one of the partner carriers' roaming carrier partners, may be associated with a different MCC and/or MNC from those of the home network. Based on a set of allocation rules 1510, the control center 1420 determines whether the bootstrap IMSI 1511 should be replaced by a new IMSI that is local to or otherwise preferred for the deployed location. Examples of the allocation rules 1510 can include: the amount of mobile usage, the amount of billable mobile usage, the first network registration attempt on a roaming network, the length of time that the mobile device has been roaming, the subscription status (e.g., the level of priority), the number of available IMSIs, the agreement with the network carrier for the deployed location, and the like.

Specific examples of allocation rules 1510 may include that the allocation rule specifies that a new or second one of the IMSIs is selected based on an initial network registration of the first IMSI (e.g. bootstrap IMSI 1511) and/or in an activation ready state or an activated state. A second one of the IMSIs is selected based on a country of an initial network registration and/or in an activated state. A second one of the IMSIs is selected based on a first network registration of the first IMSI with a CDR. A second one of the IMSIs is selected based on a first network registration of the first IMSI with a CDR and/or in an activated state. A second one of the IMSIs is selected based on a first network registration of the first IMSI with a first billable CDR in a first billing cycle. A second one of the IMSIs is selected based on a first network registration of the first IMSI with a last billable CDR in a first billing cycle. A second one of the IMSIs is selected based on a first network registration of the first IMSI with x % billable volume in a first billing cycle.

If an IMSI replacement should be made, the control center 1420 triggers IMSI switching by having the OTA 1440 send the new IMSI to the mobile device, and by adding/provisioning the new IMSI to the HLR 1430 and removing/purging the bootstrap IMSI from the HLR 1430.

With the new IMSI, the mobile device can communicate wirelessly in the deployed location as if it were operating within its home network or as an otherwise preferred roaming network. Incoming and outgoing mobile transmissions may be managed by the local partner carrier network without being re-routed to the home network. In one embodiment, the control center 1420 can monitor the network usage and collect billing information. The billing information can be forwarded to the local partner carrier or preferred home network partner, which generates an invoice for account settlement. The invoice will be sent to the end user or a customer organization 1550 through which the end user subscribes to the mobile communication service. In an alternative embodiment, the control center 1420 can generate the invoice based on the collected billing information.

In the following description with reference to FIGS. 16-20, a number of examples illustrating the process of IMSI switching are described. To avoid obscuring the description, some of the signaling paths and network elements are omitted from FIGS. 16-20. Some of the network elements shown in FIGS. 16-20 refer back to FIG. 14A. However, it is understood that the processes illustrated in FIGS. 16-20 may be implemented by a network architecture different from the embodiment of FIG. 14A. Further, to simplify the discussion, the following examples only describe 2/3G GSM packet-based routing. It is understood that other types of wireless data, such as messaging, voice calls, faxes, and other types of wireless communications can also be supported as well as other wireless technologies such as 4G LTE or LTE Advanced. In the following description, bracketed numerals are associated with actions while un-bracketed numerals are associated with entities or data items (e.g., IMSIs).

Figure 16:
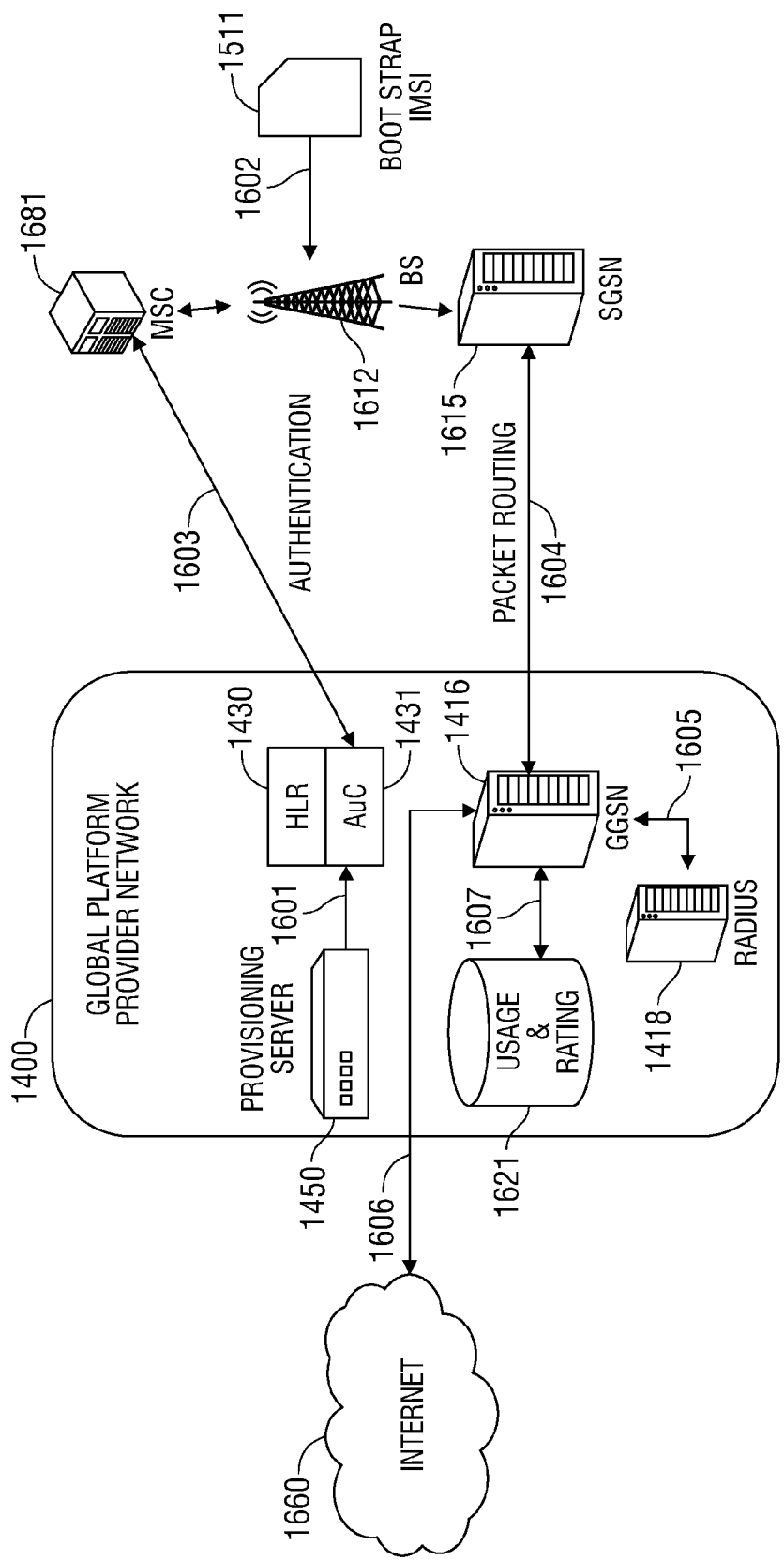
FIG. 16 illustrates an embodiment of a process for activating a mobile device having a bootstrap IMSI.

FIG. 16 illustrates an embodiment of a process for initial network registration of a mobile device having a bootstrap IMSI (e.g., the bootstrap IMSI 1511). Initially, the mobile device is installed with a SIM programmed with the bootstrap IMSI 1511. The bootstrap IMSI 1511 is the key to a subscription record in the HLR 1430 operated, or otherwise accessible, by the global platform provider. As described above, the bootstrap IMSI 1511 can be assigned to the mobile device by an equipment supplier, and is within the range(s) of IMSIs allocated to the global platform provider. Upon receiving a service order, the provisioning server 1450 adds the bootstrap IMSI 1511 into the HLR 1430, as well as other subscription information in a subscription record that uses the bootstrap IMSI 1511 as the key (1601). The HLR 1430 then indicates the IMSI as activated. When the mobile device sends a request for a wireless network connection, the request is first sent to the nearest base station (BS) tower 1612 operated by the home network carrier (e.g., the carrier identified by the bootstrap IMSI as the home network carrier) (1602) or visited network carrier. The BS tower 1612 forwards the request to a nearest MSC 1681, which sends an authentication request to the HLR 1430/AuC 1431 for the mobile device (1603). The HLR 1330/AuC 1431 then authenticates the bootstrap IMSI 1511. Upon authentication, the BS 1612 routes data packets from the mobile device to an SGSN 1615 operated by the serving network carrier, which forwards the data packets to the GGSN 1416 (1604). Before granting access to the external network (e.g., the Internet 1660), the GGSN 1416 requests authorization and authentication from the Radius 1418 (1605). Upon receipt of authorization and authentication, the GGSN 1416 routes the data packets to the Internet 1660 (1606). The global platform provider then collects network usage information (e.g., call detail records (CDRs)) from the GGSN 1416 or Radius 1418 and stores in a usage and rating database 1621.

Figure 17:
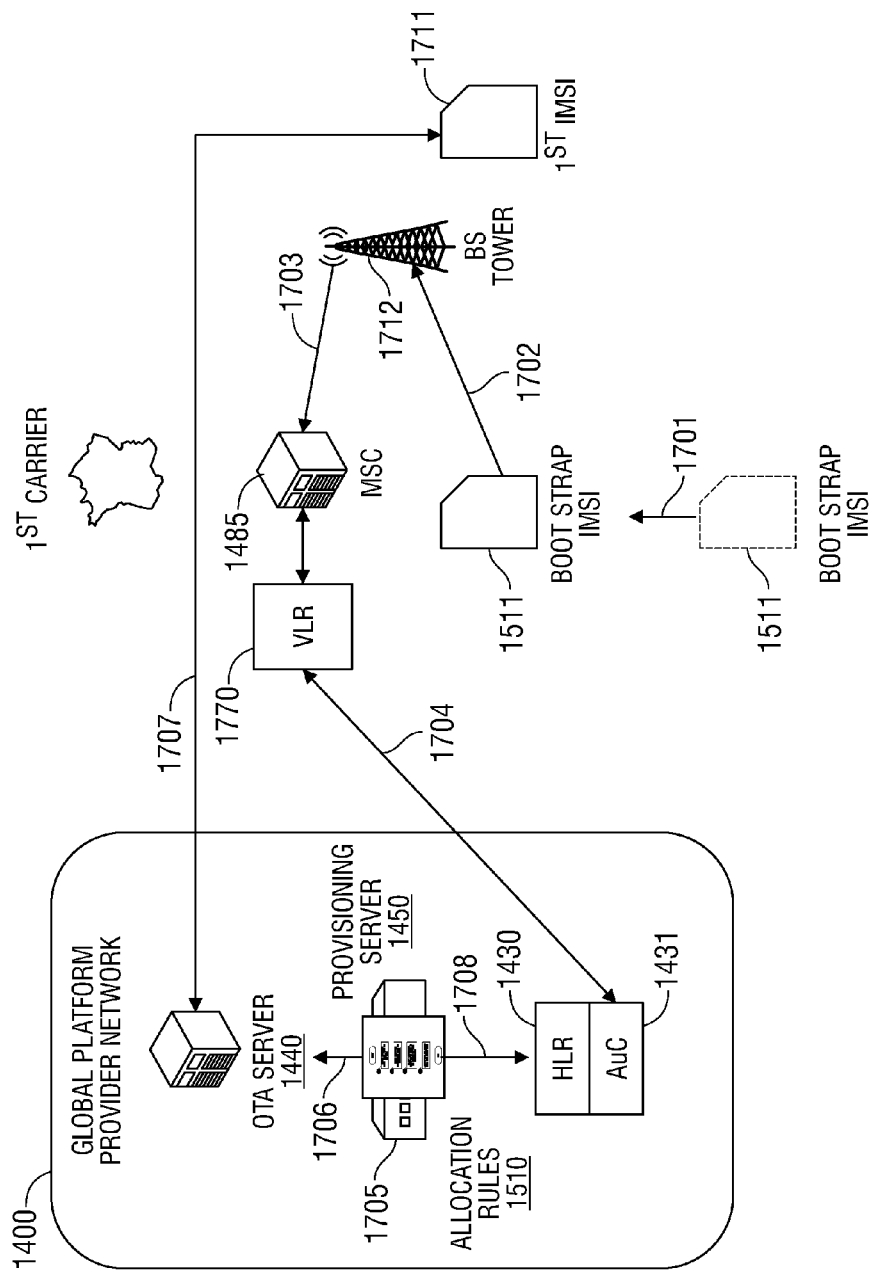
FIG. 17 illustrates a process for performing IMSI switching.

FIG. 17 illustrates a process for performing IMSI switching. In this case, the mobile device with a bootstrap IMSI 1511 is deployed to a country/network that is foreign to the bootstrap IMSI 1511 (i.e., the SIM is roaming) (1701). In one embodiment, the first carrier can be a partner carrier operating the partner carrier network 1480 of FIG. 14A. At this point, the bootstrap IMSI 1511 remains actively provisioned in the HLR 1430. The mobile device sends a registration request to the nearest BS tower 1712 (1702), which forwards the request to the MSC 1485 and a VLR 1770 associated with the MSC 1485 (1703). Both the MSC 1485 and the VLR 1770 are operated by the first carrier. The VLR 1770 informs the HLR 1430 that the mobile device has roamed away from its home network, and obtains subscription information of the mobile device from the HLR 1430 (1704). The mobile device then registers in the newly deployed location via roaming.

The notification from the VLR 1770 triggers the provisioning server 1450 to check allocation rules 1510 to determine whether the mobile device should be switched to a local or otherwise preferred new IMSI (e.g., a first IMSI 1711 local to the first carrier network) (1605). This local IMSI 1711 is also within a range of IMSIs allocated to the global platform provider. By using the first IMSI 1711 in the deployed location, the mobile device can communicate wirelessly without being treated as a roaming device. Additionally, as the first IMSI 1711 is allocated to the global platform provider, the global platform provider can monitor the signaling or usage of the mobile device to determine whether there is a need to perform further IMSI switching.

If the provisioning server 1450 determines that an IMSI switching should be performed based on the allocation rules 1510, the provisioning server 1450 directs the OTA server 1440 to send the first IMSI 1711 to the mobile device (1706). The first IMSI 1711 can be sent by encrypted transmission (e.g., an encrypted SMS) (1707). Upon receipt of the first IMSI 1711, the mobile device changes its profile in the SIM and returns a receipt to the OTA server 1440. The provisioning server 1450 also updates the HLR 1430 by adding/provisioning and activating the first IMSI 1711 to the mobile device's subscription record. When the mobile device re-registers on the first carrier's network with the new IMSI 1711 via the HLR 1430, the HLR 1430 will send a message to the provisioning server 1450 that the mobile device has successfully registered with the new IMSI 1711. At this point, the provisioning server 1450 will remove the bootstrap IMSI 1511 from the HLR 1430 (1708).

Figure 18:
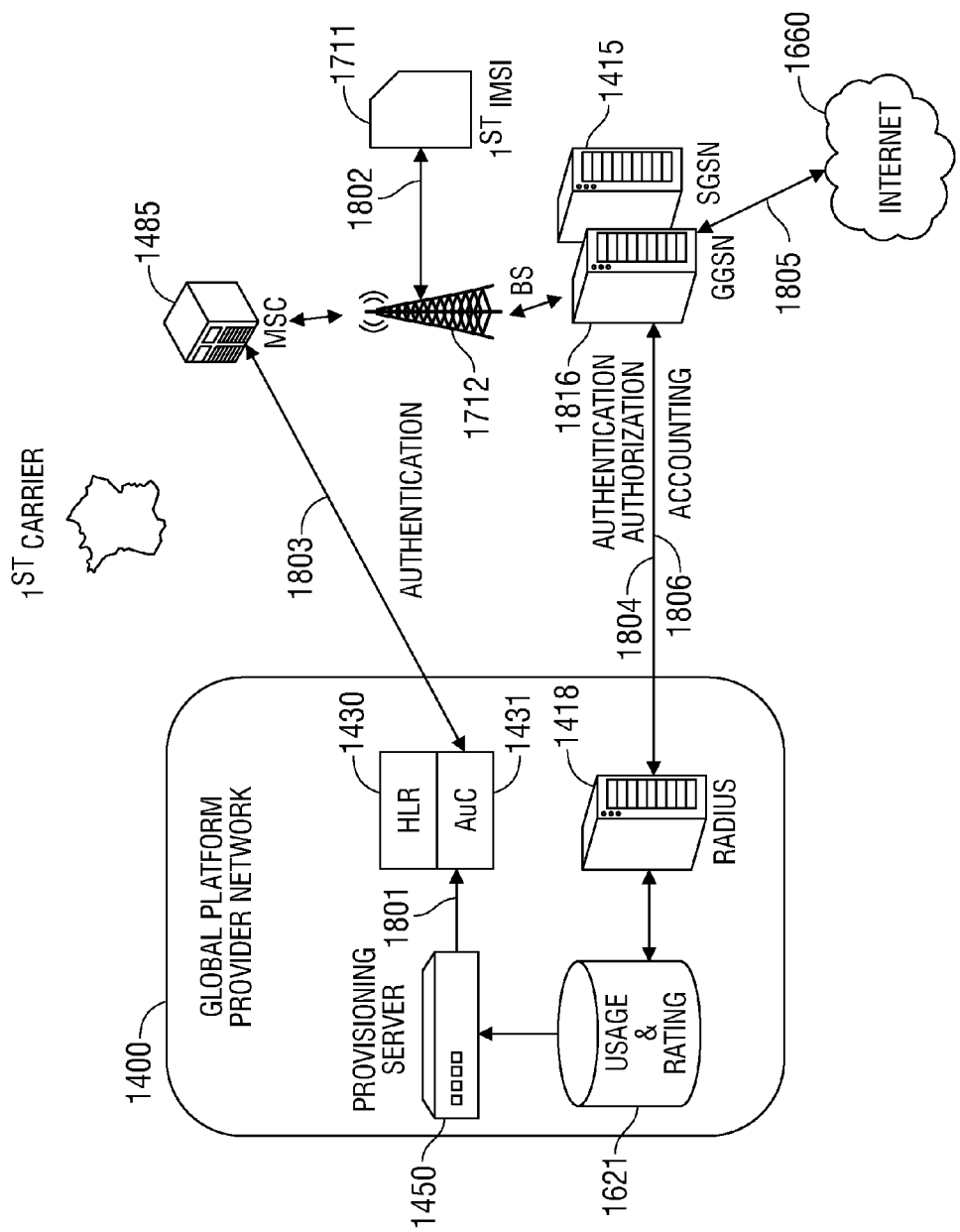
FIG. 18 illustrates an embodiment of a process for operating the mobile device after IMSI switching.

FIG. 18 illustrates an embodiment of a process for operating the mobile device after the IMSI switching described in FIG. 17. As described in FIG. 17, the HLR 1430 adds and activates the first IMSI 1711 and removes the bootstrap IMSI 1511 as directed by the provisioning server 1450 (1801). When the mobile device sends a request for a network connection to the nearest BS tower 1712 (1802), the BS tower 1712 forwards the request to the MSC 1485 operated by the first carrier. The MSC 1485 recognizes that the request is associated with the first IMSI 1711, which is a local IMSI to the first carrier network. The MSC 1485 then sends an authentication request to the HLR 1330 (1803). In response, the HLR 1430 authenticates the first IMSI 1711. Upon authentication, the BS tower 1712 routes data packets from the mobile device to the SGSN 1415 operated by the first carrier, which forwards the data packets to a GGSN 1816 associated with the SGSN 1415. Before granting access to an external network (e.g., the Internet 1660), the GGSN 1816 requests authorization and authentication from the Radius 1418 (1804). Upon receipt of authorization and authentication, the GGSN 1816 routes the data packets from the mobile device to the Internet 1660 (1805). In this example, as the GGSN 1816 is operated by the first carrier, it is the first carrier that provides the CDRs and accounting to the usage and rating database 1621 operated by the global platform provider (1807). In other embodiments, the Radius server 1418 may provide the CDRs and accounting to the usage and rating database 1621.

Figure 19:
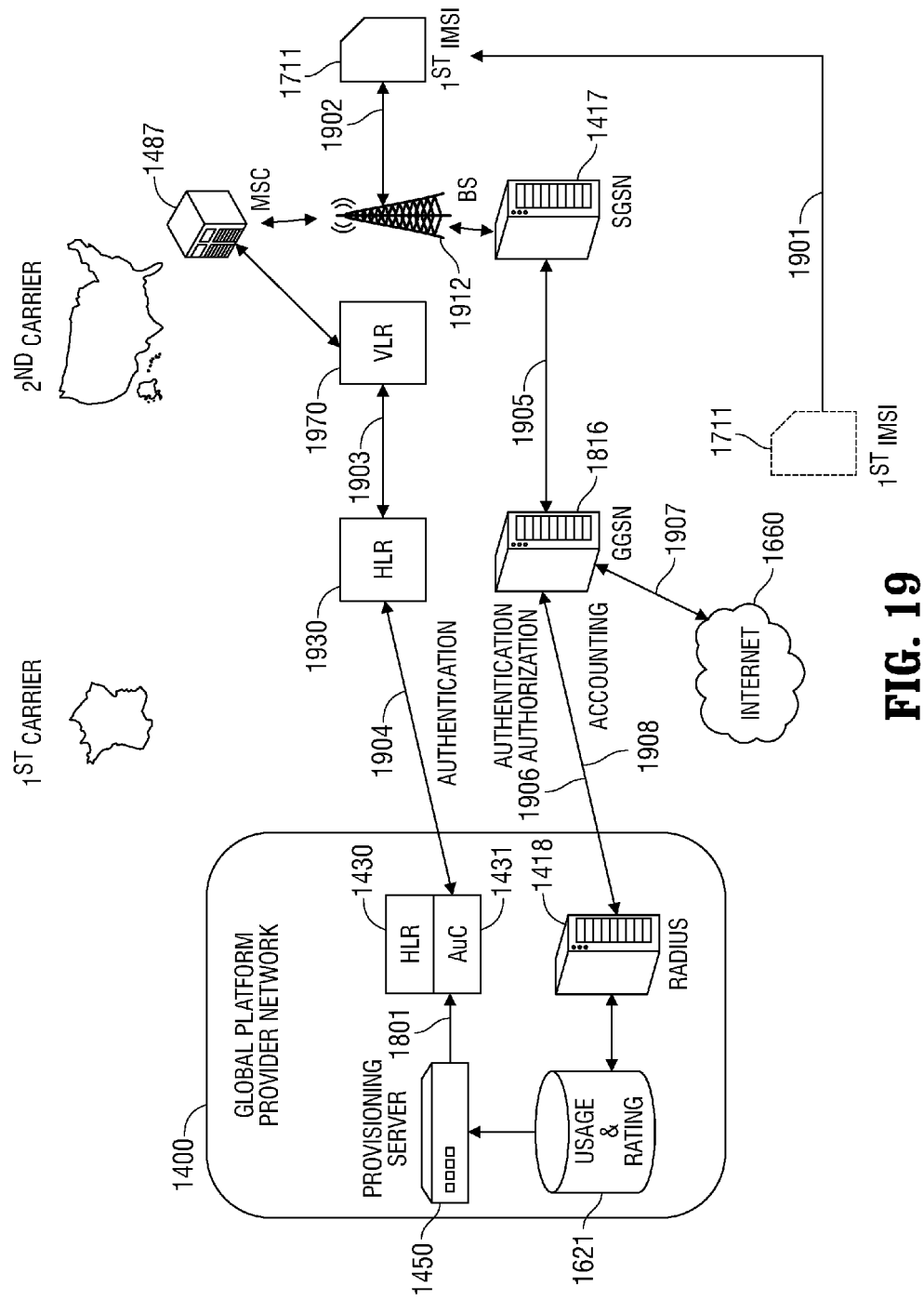
FIG. 19 illustrates an embodiment of a process for operating the mobile device as a roaming device after IMSI switching.

FIG. 19 illustrates an embodiment of a process for operating the mobile device as a roaming device after the IMSI switching described in FIG. 17. After the mobile device is successfully switched to the first IMSI 1711 and operating in the first carrier network as a local mobile device, the mobile device roams to another location serviced by a second carrier (1901). In one embodiment, the second carrier can be a partner carrier operating the partner carrier network 1490 of FIG. 14A. At this point, the first IMSI 1711 remains in the HLR 1430. The mobile device sends a registration request to the nearest BS tower 1912 (1902), which forwards the request to the MSC 1487 and a VLR 1970 associated with the MSC 1487. Both the MSC 1487 and the VLR 1970 are operated by the second carrier. The VLR 1870 informs a HLR 1930 of the first carrier network that the mobile device has enters the second carrier network, and request authentication of the mobile device (1903). The HLR 1930 forwards the authentication request to the HLR 1430 of the global platform provider network 1400, and the HLR 1430 authenticate the mobile device (1904). The mobile device then registers and activates in the new location via roaming. In some embodiments, the VLR 1970 will send the authentication request directly to the HLR 1430 of the global platform Upon authentication, the BS tower 1912 routes data packets from the mobile device to the SGSN 1417 operated by the second carrier. The SGSN 1417 forwards the data packets to the GGSN 1816 operated by the first carrier (1905). Before granting access to an external network (e.g., the Internet 1660), the GGSN 1816 requests authorization and authentication from the Radius 1418 (1906). Upon receipt of authorization and authentication, the GGSN 1816 routes the data packets to the Internet 1660 (1907). In this example, as the GGSN 1816 is operated by the first carrier, it is the first carrier that provides the CDRs and accounting to the usage and rating database 1621 operated by the global platform provider (1908). In other embodiments, the Radius server 1418 may provide the CDRs and accounting to the usage and rating database 1621.

Figure 20:
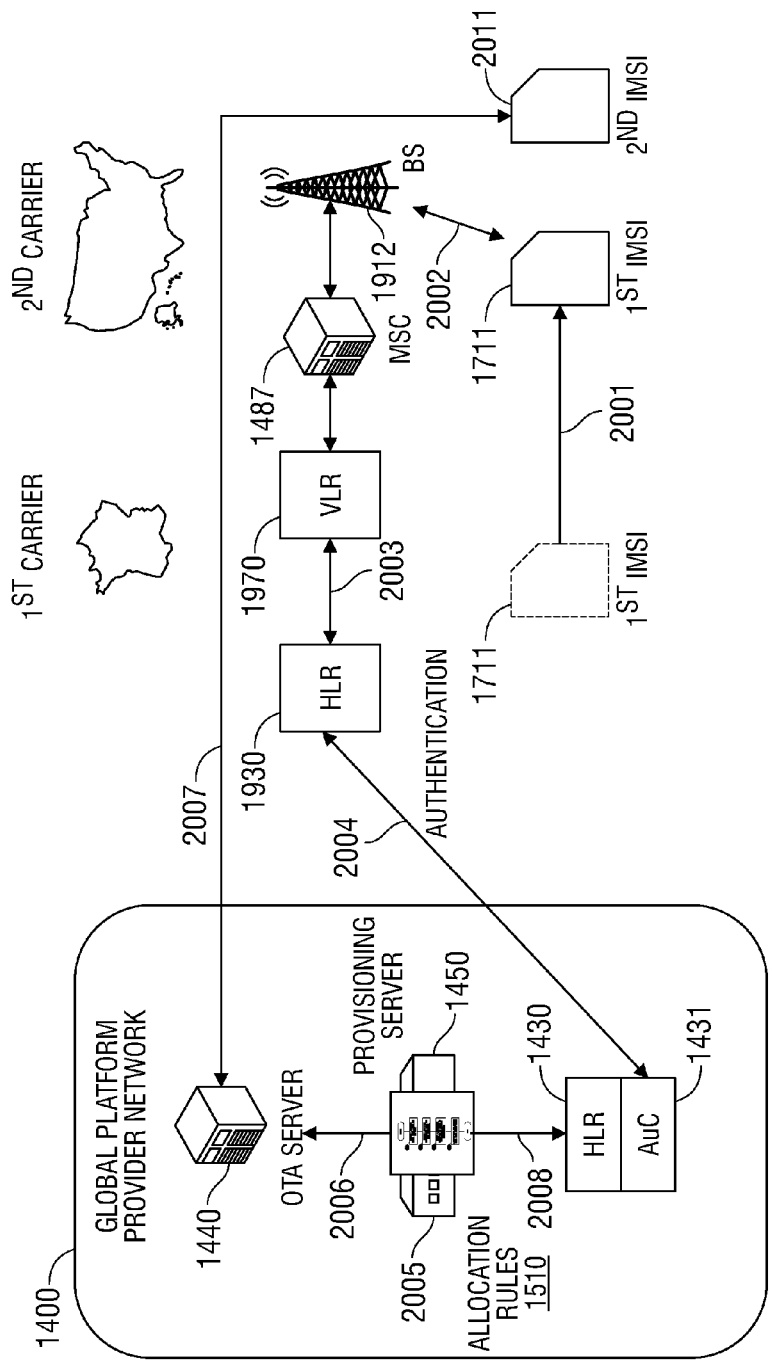
FIG. 20 illustrates an embodiment of a process for performing another IMSI switching.

FIG. 20 illustrates an embodiment of a process for performing another IMSI switching. The process of 2001-2004 of FIG. 20 is similar to 1901-1904 of FIG. 19, and is therefore not repeated. In response to the authentication request from the first carrier's HLR 1930, the provisioning server 1450 checks allocation rules 1510 to determine whether the mobile device should be switched to a local IMSI (that is, a second IMSI 2011 local to the second carrier network) (2005). Further, the second IMSI 2011 is within a range of IMSIs allocated to the global platform provider. By using the second IMSI 2011 in the deployed location, the mobile device can communicate wirelessly without being treated as a roaming device. Additionally, as the second IMSI 2011 is allocated to the global platform provider, the global platform provider can monitor the usage of the mobile device to determine whether there is a need to perform further IMSI switching.

If the provisioning server 1450 determines that an IMSI switching should be performed based on the allocation rules 1510, the provisioning server 1450 directs the OTA server 1440 to send the second IMSI 1911 to the mobile device (2006). The second IMSI 2011 can be sent by encrypted transmission (e.g., an encrypted SMS) (2007). Upon receipt of the second IMSI 2011, the mobile device changes its profile in the SIM and returns a receipt to the OTA server 1440. The provisioning server 1450 also updates the HLR 1430 by adding/provisioning and activating the second IMSI 2011 to the subscription record of the mobile device and by removing/purging the first IMSI 1711 from the HLR 1430 (2008).

As described herein, the processes performed by the provisioning server 1450, the OTA server 1440, the HLR 1430 and other network elements shown in FIGS. 14-20 may be implemented by specific configurations of hardware such as application specific integrated circuits (ASICs) configured to perform certain operations or having a predetermined functionality, or electronic devices executing software instructions stored in memory embodied in a non-transitory computer readable storage medium. Examples of non-transitory computer-readable storage media include: magnetic disks; optical disks; random access memory; read only memory; flash memory devices; phase-change memory, and the like. In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising a global platform provider network operative to communicate with a plurality of wireless networks each having a network home location register (HLR) and further operative to communicate with a plurality of mobile devices, with each of the wireless networks operated by a different carrier, the global platform provider network comprising:
   a provisioning server having access to a set of international mobile subscriber identities (IMSI) allocated to the global platform provider network by the plurality of wireless networks;
   a distributed HLR of the global platform provider network to store at least one subscription record of a mobile device of the plurality of mobile devices, the mobile device having a subscriber identity module (SIM) identified by a currently activated first IMSI, the currently activated first IMSI belonging to and allocated by the provisioning server from the set of IMSIs allocated to the global platform provider network, wherein the distributed HLR of the global platform provider network is realized from a plurality of HLR segments, and wherein the provisioning server is operative to:
   receive a notification from the distributed HLR that the mobile device has moved from a first wireless network, the notification triggered by the distributed HLR of the global platform provider network receiving an update initiated from a visitor location register (VLR) in a second wireless network into which the mobile device has moved, the second wireless network being different to the first wireless network;
   following confirmation that an allocation rule is satisfied, add and activate a second one of the IMSIs in the set of IMSIs of the distributed HLR of the global platform provider network and remove the currently activated first IMSI from the distributed HLR of the global platform provider network; and send the second IMSI to the mobile device to enable the mobile device to communicate wirelessly in the second wireless network as a local device or a roaming subscriber with a new IMSI;

wherein at least one of the HLR segments is associated with a carrier of one of the plurality of wireless networks, the carrier-associated HLR segment being readable and writable by the provisioning server under an agreement between the carrier and a provider of the system.

2. The system of claim 1, wherein the distributed HLR of the global platform provider network manages the set of IMSIs, and wherein the set of IMSIs include multiple subsets with each of the subsets including the IMSIs that have a different mobile country code and different mobile network code.

3. The system of claim 1, wherein each IMSI in the set of IMSIs includes a mobile country code (MCC) and a mobile network code (MNC) that identify one of the wireless networks, and a mobile subscriber identity number (MSIN) that includes one or more digits having one or more pre-designated values to identify the IMSI as being allocated to the system.

4. The system of claim 1, wherein the wireless networks are located in multiple countries.

5. The system of claim 1, wherein the allocation rule is based on an agreement and a carrier of the first wireless network.

6. The system of claim 1, wherein the allocation rule specifies that the second one of the IMSIs is selected based on an initial network registration of the first IMSI in a test ready state, inventory state, activation ready state or an activated state.

7. The system of claim 1, wherein the allocation rule specifies that the second one of the IMSIs is selected based on a country of an initial network registration in a test ready state, inventory state, activation ready state or activated state.

8. The system of claim 1, wherein the allocation rule specifies that the second one of the IMSIs is selected based on a first network registration of the first IMSI and a call detail record (CDR).

9. The system of claim 1, wherein the allocation rule specifies that the second one of the IMSIs is selected based on a first network registration of the first IMSI and a CDR in a test ready state, inventory state, activation ready state or activated state.

10. The system of claim 1, wherein the allocation rule specifies that the second one of the IMSIs is selected based on a first network registration of the first IMSI and a first billable CDR in a first billing cycle.

11. The system of claim 1, wherein the allocation rule specifies that the second one of the IMSIs is selected based on a first network registration of the first IMSI and a last billable CDR in a first billing cycle.

12. The system of claim 1, wherein the allocation rule specifies that the second one of the IMSIs is selected based on a first network registration of the first IMSI and a defined percentage of billable data volume in a first billing cycle.

13. The system of claim 1, wherein the allocation rule specifies that the second one of the IMSIs is selected based on a first network registration of the first IMSI and after a defined number of consecutive billable months of usage.

14. The system of claim 1, wherein the allocation rule specifies at least one of an amount of mobile usage, a length of time that the mobile device has been roaming, a subscription status, a number of available IMSIs, an agreement with the network carrier for a deployed location.

15. A method to communicate within a system comprising a global platform provider network operative to communicate with a plurality of wireless networks each having a network home location register (HLR) and further operative to communicate with a plurality of mobile devices, with each of the wireless networks operated by a different carrier, and wherein the global platform provider network includes a provisioning server having access to a set of international mobile subscriber identities (IMSI) allocated to the global platform provider network by the plurality of wireless networks, the method comprising:

storing in a distributed HLR of the global platform provider network at least one subscription record of a mobile device of the plurality of mobile devices, the mobile device having a subscriber identity module (SIM) identified by a currently activated first international mobile subscriber identity (IMSI), the currently activated first IMSI belonging to the distributed HLR in the global provider network and allocated by the provisioning server from the set of IMSIs allocated to the global platform provider network, wherein the distributed HLR of the global platform provider network is realized from a plurality of HLR segments, and wherein the provisioning server is operative to:

receive a notification from the distributed HLR that the mobile device has moved from a first wireless network, the notification triggered by the distributed HLR of the global platform provider network receiving an update initiated from a visitor location register (VLR) in a second wireless network into which the mobile device has moved, the second wireless network being different to the first wireless network;

following confirmation that an allocation rule is satisfied, add and activate a second one of the IMSIs in the set of IMSIs to the distributed HLR of the global platform provider network and remove the currently activated first IMSI from the distributed HLR of the global platform provider network; and send the second IMSI to the mobile device to enable the mobile device to communicate wirelessly in the second wireless network as a local device or a roaming subscriber with a new IMSI;

wherein at least one of the HLR segments is associated with a carrier of one of the plurality of wireless networks, said carrier-associated HLR segment being readable and writable by the provisioning server under an agreement between the carrier and a provider of the system.

* * * * *